US010270520B2

(12) United States Patent
Arapoglou et al.

(10) Patent No.: US 10,270,520 B2
(45) Date of Patent: Apr. 23, 2019

(54) JOINT TRANSMITTER SIGNAL PROCESSING IN MULTI-BEAM SATELLITE SYSTEMS

(71) Applicant: European Space Agency, Paris (FR)

(72) Inventors: Pantelis-Daniel Arapoglou, Noordwijk (NL); Alberto Ginesi, Noordwijk (NL); Giorgio Taricco, Turin (IT); Dimitrios Christopoulos, Luxembourg (LU); Symeon Chatzinotas, Luxembourg (LU); Bjorn Ottersten, Luxembourg (LU); Miguel Angel Vazquez, Castelldefels (ES); Ana Isabel Perez-Neira, Castelldefels (ES); Stefano Andrenacci, Bologna (IT); Alessandro Vanelli Coralli, Bologna (IT)

(73) Assignee: European Space Agency, Paris (FR)

( * ) Notice: Subject to any disclaimer, the term of this patent is extended or adjusted under 35 U.S.C. 154(b) by 129 days.

(21) Appl. No.: 15/319,682

(22) PCT Filed: Apr. 14, 2015

(86) PCT No.: PCT/EP2015/058023
§ 371 (c)(1),
(2) Date: Dec. 16, 2016

(87) PCT Pub. No.: WO2015/192995
PCT Pub. Date: Dec. 23, 2015

(65) Prior Publication Data
US 2017/0149493 A1    May 25, 2017

(30) Foreign Application Priority Data

Jun. 18, 2014  (EP) .................................... 14172961

(51) Int. Cl.
*H04B 7/185*  (2006.01)
*H04B 7/06*  (2006.01)
(Continued)

(52) U.S. Cl.
CPC ....... *H04B 7/18513* (2013.01); *H04B 7/0452* (2013.01); *H04B 7/0617* (2013.01);
(Continued)

(58) Field of Classification Search
None
See application file for complete search history.

(56) References Cited

U.S. PATENT DOCUMENTS

2007/0280098 A1  12/2007  Bhatt et al.
2008/0219194 A1   9/2008  Kim et al.
(Continued)

FOREIGN PATENT DOCUMENTS

EP    1 681 821 A2    7/2006

OTHER PUBLICATIONS

Gagliardi et al., "PCM Data Reliability Monitoring Through Estimation of Signal-to-Noise Ratio," *IEEE Transactions on Communication Technology* COM—16(3):479-486, 1968.
(Continued)

*Primary Examiner* — George C Atkins
(74) *Attorney, Agent, or Firm* — Seed Intellectual Property Law Group LLP

(57) ABSTRACT

A, method and apparatus for wirelessly transmitting data to a plurality of terminals in each of a plurality of beams through a plurality of transmit feeds includes selecting, for each beam, two or more terminals among the plurality of terminals in the beam as a subgroup of terminals, on the basis of channel state information of the plurality of terminals; determining, for each beam, equivalent channel state information representing the subgroup of terminals in the
(Continued)

beam on the basis of the channel state information of the terminals of at least one of the plural subgroups of terminals; and determining a set of weight coefficients that relate the plurality of transmit feeds to a plurality of signals that are intended for transmission in the plurality of beams on the basis of the equivalent channel state information representing the plural subgroups of terminals. Also disclosed is a method and apparatus for receiving data transmitted via wireless transmission to a plurality of beams through a plurality of transmit feeds and estimating a channel on the basis of the received data. The present disclosure is advantageously applicable to satellite communication systems.

6 Claims, 11 Drawing Sheets

(51) Int. Cl.
  *H04B 7/0452* (2017.01)
  *H04L 25/02* (2006.01)
(52) U.S. Cl.
  CPC ....... *H04B 7/0626* (2013.01); *H04L 25/0204* (2013.01); *H04L 25/0224* (2013.01); *H04L 25/0248* (2013.01)

(56) References Cited

U.S. PATENT DOCUMENTS

| | | | | |
|---|---|---|---|---|
| 2008/0310566 | A1* | 12/2008 | Tsuruta | H04L 27/0014 375/350 |
| 2010/0183054 | A1* | 7/2010 | Daly | H04L 25/03006 375/219 |
| 2011/0194655 | A1* | 8/2011 | Sampath | H04L 27/0014 375/341 |
| 2012/0314820 | A1* | 12/2012 | Kang | H04L 27/266 375/344 |

OTHER PUBLICATIONS

Costa, "Writing on Dirty Paper," *IEEE Transactions on Information Theory* IT—29(3):439-441, 1983.
D'Andrea et al., "Design of Quadricorrelators for Automatic Frequency Control Systems," *IEEE Transactions on Communications* 41(6):988-997, 1993.
Luise et al., "Carrier Frequency Recovery in All-Digital Modems for Burst-Mode Transmissions," *IEEE Transactions on Communications* 43(2-4):1169-1178, 1995.
Pauluzzi et al., "A Comparison of SNR Estimation Techniques for the AWGN Channel," *IEEE Transactions on Communications* 48(10):1681-1691, 2000.
Lopez, "Multiplexing, Scheduling, and Multicasting Strategies for Antenna Arrays in Wireless Networks," Doctoral thesis, Massachusetts Institute of Technology, Boston, Massachusetts, USA, Aug. 2002, 170 pages.
Jindal et al., "On the Duality of Gaussian Multiple-Access and Broadcast Channels," *IEEE Transactions on Information Theory* 50(5):768-783, 2004.
Spencer et al., "Zero-Forcing Methods for Downlink Spatial Multiplexing in Multiuser MIMO Channels," *IEEE Transactions on Signal Processing* 52(2):461-471, 2004.
Caire et al., "Perspectives of Adopting Interference Mitigation Techniques in the Context of Broadband Multimedia Satellite Systems," *23$^{rd}$ International Communications Satellite Systems Conference*, Rome, Italy, Sep. 1-5, 2005, 8 pages.
Cottatellucci et al., "Interference Mitigation Techniques for Broadband Satellite Systems," *24$^{th}$ International Communications Satellite Systems Conference*, San Diego, California, USA, Jun. 11-14, 2006, 13 pages.
Sidiropoulos et al., "Transmit Beamforming for Physical-Layer Multicasting," *IEEE Transactions on Signal Processing* 54(6):2239-2251, 2006.
Karipidis et al., "Quality of Service and Max-Min Fair Transmit Beamforming to Multiple Cochannel Multicast Groups," *IEEE Transactions on Signal Processing* 56(3):1268-1279, 2008.
Kim et al., "Robust frame synchronization for the DVB-S2 system with large frequency offsets", *Int. J. Commun. Syst. Network* 2009; 27:35-52.
Matskani et al., "Efficient Batch and Adaptive Approximation Algorithms for Joint Multicast Beamforming and Admission Control," *IEEE Transactions on Signal Processing* 57(12):4882-4894, 2009. (14 pages).
Silva et al., "Linear Transmit Beamforming Techniques for the Multigroup Multicast Scenario," *IEEE Transactions on Vehicular Technology* 58(8):4353-4367, 2009.
Pedone et al., "Frame Synchronization in Frequency Uncertainty," *IEEE Transactions on Communications* 58(4):1235-1246, 2010.
Arnau et al., "Performance study of multiuser interference mitigation schemes for hybrid broadband multibeam satellite architectures," *EURASIP Journal on Wireless Communications and Networking* 2012(132), 2012. (19 pages).
Christopoulos et al., "Linear and nonlinear techniques for multibeam joint processing in satellite communications," *EURASIP Journal on Wireless Communications and Networking* 2012(162), 2012. (13 pages).
Zheng et al., "Generic Optimization of Linear Precoding in Multibeam Satellite Systems," *IEEE Transactions on Wireless Communications* 11(6):2308-2320, 2012.
Ginesi, "DVB-SX Channel Models", TM-S2 Channel Model Group, (ESA/ESTEC), Jan. 17, 2013. (67 pages).
Lim et al., "Recent Trend of Multiuser MIMO in LTE-Advanced," *IEEE Communications Magazine* 51(3):127-135, 2013.
ETSI, "Digital Video Broadcasting (DVB); Second generation framing structure, channel coding and modulation systems for Broadcasting, Interactive Services, News Gathering and other broadband satellite applications; Part 2: DVB-S2 Extensions (DVB-S2X)," *EN 302* 307-2(V1.1.1), 2014. (139 pages).
Invitation to Pay Additional Fees, dated Jun. 12, 2015, for International Application No. PCT/EP2015/058023, 7 pages.
International Search Report and Written Opinion, dated Sep. 21, 2015, for International Application No. PCT/EP2015/058023, 19 pages.

* cited by examiner

JOINT TRANSMITTER SIGNAL PROCESSING IN MULTI-BEAM SATELLITE SYSTEMS

BACKGROUND

Technical Field

The present disclosure relates to a method and an apparatus for transmitting data to a plurality of beams through a plurality of transmit feeds, and to mitigating inter-beam interference. The disclosure further relates to a method and an apparatus for receiving data transmitted via wireless transmission to a plurality of beams through a plurality of transmit feeds, and to synchronization at the terminal location. The disclosure is particularly though not exclusively applicable to multi-beam broadband communication systems, in particular providing interactivity between the terminal side and the transmitter side, and in particular to high throughput, multiple beam satellite communication systems, e.g., for providing internet services.

Description of the Related Art

Telecom satellite systems providing multiple spot-beam (or simply beam) coverage can substantially increase the system capacity by re-using the available frequency spectrum among the beams. If different signals are transmitted to a multiplicity of beams in order to provide point-to-point interactive services, increasing the frequency re-use leads to a large increase in intra-system interference between the beams (inter-beam interference), which renders the use of the additional spectrum futile. Intra-system interference is generated by the sidelobes of the co-channel beam radiation patterns.

To address the issue of high inter-beam interference in an aggressive frequency re-use multi-beam configuration, joint processing of the signals intended for transmission to the different beams can be carried out at the forward link transmitter (usually the gateway (GW) or hub). This processing, referred to in the following under the generic term "precoding", intends to 'revert' the impact of the satellite channel and interferences. This way the additional spectrum can be exploited and a much higher system capacity can be delivered. A precondition for precoding to work is that the forward link receivers (satellite terminals, also referred to as user terminals (UTs) or simply terminals) provide accurate and timely reports of their channel (channel state information represented by a channel state vector, or simply channel vector) back to the transmitter, which the transmitter uses to form the appropriate precoding matrix.

Various flavors of precoding are known in the prior art and are adopted, e.g., in terrestrial cellular radio standards such as the LTE (Long Term Evolution) and LTE-Advanced and fall under the broad term of multi-user multiple-input multiple-output (MU-MIMO) techniques. C. Lim et al., "Recent trend of multiuser MIMO in LTE-Advanced," IEEE Commun. Mag., pp. 127-135, March 2013 discloses an example of such a precoding technique. In contrast to MU-MIMO techniques in LTE-Advanced, the scale of the problem dealt with in high throughput multi-beam satellite communication systems is much larger since precoding in the satellite context involves tens or hundreds of satellite antenna feeds (transmit feeds) with corresponding spot beams formed on ground, each serving at least one fixed UT in each epoch.

As regards precoding, the prior art has been to a large extent preoccupied with evaluating various linear and non-linear precoding techniques over the multi-beam satellite channel in order to assess which one approaches the optimum dirty paper coding (DPC) bound described in M. Costa, "Writing on dirty paper," IEEE Trans. Inf. Theory, vol. 29, no. 3, pp. 439-441, May 1983. In terms of choice of precoding techniques, it has been found in D. Christopoulos, S. Chatzinotas, G. Zheng, J. Grotz and B. Ottersten, "Linear and nonlinear techniques for multibeam joint processing in satellite communications," EURASIP Journal on Wireless Communications and Networking, 2012 that simple linear techniques already grasp the largest part of the potential multi-user gains with manageable complexity and deliver improvements that at least double the throughput of existing systems. Joint processing at the gateway in the form of precoding is also possible whenever the system uses multiple beams to transmit common information in a point-to-multipoint fashion, as in the case for example of broadcasting or multicasting services. For such systems, precoding aims at elevating the worst-case signal-to-noise receiver within each beam and can be applied provided there is feedback from the receivers.

However, a new problem arises when not considering terrestrial applications, but broadband satellite communication systems. In these, allowing for high throughput while at the same time enabling interactivity between the plural UTs and the GW requires that each data stream transmitted from an antenna feed (transmit feed) towards a spot beam on ground is addressed to multiple UTs and is acting as a container of their data to provide a high degree of statistical multiplexing within the physical layer frame. In such a framework conventional precoding algorithms addressing a single UT per beam are no longer feasible and precoding algorithms addressing multiple satellite terminals with a single precoding matrix are required. Possible frameworks of this kind include the multiplexing of multiple users' data within the DVB-S2 (digital video broadcasting-satellite second generation) base band frame in order to achieve a high framing efficiency, as well as the base band frame of the BGAN (Broadband Global Area Network) standard for mobile satellite services. What is thus needed is a precoding scheme for a communication system in which each of a plurality of data streams transmitted from an antenna feed towards a respective spot beam on ground is addressed to multiple UTs.

On the UT side, employing such a precoding scheme necessitates a dedicated scheme for synchronization, in order for the UT to be able to determine its channel (channel state vector), which needs to be provided to the GW to enable precoding. This is particularly challenging for system configurations in which a background of strong interference by the signals of other beams is present because of an aggressive frequency re-use scheme.

BRIEF SUMMARY

It is therefore an object of the present disclosure to overcome the above-described limitations of the prior art. It is another object to provide a method and apparatus for precoding in a MU-MIMO satellite communication system. It is yet another object to provide a method and apparatus for synchronization at the user terminal side in the framework of a MU-MIMO satellite communication system.

In view of at least some of these objects, the present disclosure provides a method for transmitting data, a corresponding apparatus for transmitting data, a method for receiving data and estimating a channel vector, and a corresponding apparatus for receiving data and estimating a channel vector having the features of the respective independent claims. Preferred embodiments of the disclosure are described in the dependent claims.

According to an aspect of the disclosure, a method for wirelessly transmitting data to a plurality of terminals in each of a plurality of beams through a plurality of transmit feeds comprises: selecting, for each beam, two or more terminals among the plurality of terminals in the beam as a subgroup of terminals, on the basis of channel state information of the plurality of terminals; determining, for each beam, equivalent channel state information representing the subgroup of terminals in the beam on the basis of the channel state information of the terminals of at least one of the plural subgroups of terminals; and determining a set of weight coefficients that relate the plurality of transmit feeds to a plurality of signals that are intended for transmission in the plurality of beams on the basis of the equivalent channel state information representing the plural subgroups of terminals. Preferably, the method further comprises transmitting the plurality of signals through the plurality of transmit feeds in accordance with respective weight coefficients among the set of weight coefficients. Further preferably, in the step of transmitting, for each signal among the plurality of signals and each transmit feed among the plurality of transmit feed, the respective signal is transmitted through the respective transmit feed weighted with a weight coefficient that relates the respective signal to the respective transmit feed. In other words, the determined set of weight coefficients (i.e., a precoding matrix) is applied to the plurality of signals. Yet further preferably, the method is a method for wirelessly transmitting data to a plurality of terminals in each of a plurality of beams through a plurality of transmit feeds in a satellite communication system.

Configured as above, the present disclosure implements multicast precoding, that is joint signal processing, at one or more transmitters of a multi-beam satellite communication system addressing multiple satellite terminals in each of multiple beams with a single precoding matrix. Different from the prior art described above, the disclosure is applicable to a case in which each data stream transmitted from a respective antenna feed (transmit feed) towards a beam (spot beam) on ground is addressed to multiple UTs and is acting as a container of their data to provide a high degree of statistical multiplexing within the physical layer frame. Selecting the subgroup of terminals based on channel state information of the plurality of terminals and determining the equivalent channel state information representing the subgroup based on the channel state information of the terminals of at least one of the plural subgroups of terminals allows constructing a precoding matrix that can be kept constant over the subgroup of terminals.

In a preferred embodiment of the present disclosure, each terminal has a channel state vector indicative of the channel state information of the respective terminal, and selecting the subgroup of terminals involves, for each beam: selecting a first terminal in the beam; and selecting, from the terminals in the beam different from the first terminal a predetermined number of terminals in accordance with a distance between the channel state vector of the respective terminal and the channel state vector of the first terminal. Preferably, selecting the subgroups of terminals further involves: determining, for each of the terminals in the beam different from the first terminal, a distance between the channel state vector of the respective terminal and the channel state vector of the first terminal. Preferably, the distance between the absolute value (modulus, or amplitude) of the channel state vector of the respective terminal and the absolute value of the channel vector of the first terminal is determined at this step. Alternatively, selecting the subgroups of terminals may further involve: determining, for each of the terminals in the beam different from the first terminal, a distance from the first terminal. Preferably, determining the distance involves determining a Euclidean distance for each of the terminals in the beam different from the first terminal. Further preferably, selecting the predetermined number of terminals involves selecting terminals with the smallest distance between (the absolute value of) their channel state vector and (the absolute value of) the channel state vector of the first terminal. Yet further preferably, the first terminal is selected randomly.

In the above, it is of advantage if determining the equivalent channel state information representing the subgroup of terminals involves, for each beam: averaging the channel state information of the terminals of the subgroup of terminals in the beam. Preferably, averaging the channel state information involves determining an arithmetic mean of quantities indicative of the channel state information of the terminals of the subgroup of terminals in the beam.

The channel vector (channel state information) of each terminal depends, among others, on a relative position of the terminal with respect to the transmitter. The present embodiment of the disclosure advantageously exploits this fact. Configured as above, the method disclosed herein achieves selection of a subgroup of terminals (user cluster) in each beam that have particularly similar channel state vectors (channel state information). Further, the method is very efficient with regard to utilization of computational power, which is of great importance especially for mobile user terminals. Averaging channel state information of the user terminals of the user cluster in order to obtain equivalent channel state information of the user cluster (i.e., equivalent channel state information representing the subgroup of terminals) allows to determine the equivalent channel state information in a particularly simple manner. As the inventors have realized, this rather simple procedure for determining the equivalent channel state information is particularly suitable in the case of selection of the user terminals in the user cluster based on geometric considerations.

In another preferred embodiment of the disclosure, each terminal has a channel state vector indicative of the channel state information of the respective terminal, and selecting the subgroup of terminals involves, for each beam: determining, for each terminal in the beam, a norm of the channel state vector of the terminal; selecting, as a first terminal, a terminal in the beam for which the norm of the channel state vector is largest (maximal); and iteratively performing, until a predetermined number of terminals have been selected: determining, for each of the terminals in the beam different from terminals that have already been selected, a projection of the channel state vector of the terminal on the subspace spanned by the channel state vectors of the terminals that have already been selected; and selecting, from the terminals in the beam different from the terminals that have already been selected, a terminal for which the channel state vector has the largest projection on the subspace spanned by the channel state vectors of the terminals that have already been selected. Preferably, selecting the subgroup of terminals involves, for each beam, whenever a terminal is selected from the terminals in the beam different from the terminals that have already been selected, determining any terminals whose channel state vector has a projection on the channel state vector of the presently selected terminal that after normalization is smaller than a predetermined threshold, and indicating said terminals as not to be considered for selection in future iterations.

In the above, it is of advantage if determining the equivalent channel state information representing the subgroup of terminals involves, for each beam: selecting the channel state information of a terminal of the subgroup of terminals in the beam as the equivalent channel state information representing the subgroup of terminals in the beam.

By the method according to this embodiment, not only the channel gains of the terminals, but also the channel phases are taken into account. This allows improving the homogeneity (similarity) of the channels vectors (channel state information) of the terminals in the user cluster by appropriate selection of the user cluster. Accordingly, the precoding matrix that is applied over the terminals of the subgroups can be made to more closely match the precoding matrices that would result from considering the terminals individually, and therefore the signal-to-noise-plus-interference ratio (SNIR) for the terminals of the subgroup is improved.

In yet another preferred embodiment of the disclosure, each terminal has a channel state vector indicative of the channel state information of the respective terminal, and determining the equivalent channel state information representing the subgroup of terminals in the beam involves, for each beam: determining a first matrix comprising the channel state vectors of the terminals of the subgroups of terminals in the plurality of beams different from the respective beam; regularizing the first matrix to obtain a regularized second matrix; determining a third matrix corresponding to the null space (kernel) of the second matrix; determining the equivalent channel state information representing the subgroup of terminals in the respective beam on the basis of the third matrix and the channel state vectors of the terminals of the subgroup of terminals in the respective beam. Therein, a matrix is understood as a representation of a linear map and can in general have any dimensions.

In the above, it is of advantage if determining the equivalent channel state information representing the subgroup of terminals in the respective beam involves: determining a fourth matrix comprising the channel state vectors of the terminals of the subgroup of terminals in the respective beam; regularizing the fourth matrix to obtain a regularized fifth matrix; and determining the equivalent channel state information representing the subgroup of terminals in the respective beam on the basis of the fifth matrix and the third matrix. Preferably, determining the set of weight coefficients involves, for each beam: determining an eigenvector having the largest eigenvalue of a sixth matrix obtainable by multiplying a seventh matrix indicative of the equivalent channel state information representing the subgroup of terminals in the respective beam with its adjoint; and determining a set of weight coefficients that relate the plurality of transmit feeds to a signal among the plurality of signals that is intended for transmission in the respective beam on the basis of the eigenvector and the third matrix.

Determining the equivalent channel information representing the user cluster and the precoding matrix by determining the null space (kernel) of the channel matrix for each beam allows to almost completely pre-cancel the inter-beam interference. Accordingly, the SNIR is improved and higher throughput of the overall system is achieved.

According to another aspect of the present disclosure, an apparatus for wirelessly transmitting data to a plurality of terminals in each of a plurality of beams through a plurality of transmit feeds comprises: a terminal selection unit configured for selecting, for each beam, two or more terminals among the plurality of terminals in the beam as a subgroup of terminals, on the basis of channel state information of the plurality of terminals; an equivalent channel state information determination unit configured for determining, for each beam, equivalent channel state information representing the subgroup of terminals in the beam on the basis of the channel state information of the terminals of at least one of the plural subgroups of terminals; and a weight coefficient determination unit configured for determining a set of weight coefficients that relate the plurality of transmit feeds to a plurality of signals that are intended for transmission in the plurality of beams on the basis of the equivalent channel state information representing the plural subgroups of terminals. Preferably, the apparatus further comprises a transmission unit configured for transmitting the plurality of signals through the plurality of transmit feeds in accordance with respective weight coefficients among the set of weight coefficients. Further preferably, the transmission unit is configured to, for each signal among the plurality of signals and each transmit feed among the plurality of transmit feed, transmit the respective signal through the respective transmit feed weighted with a weight coefficient that relates the respective signal to the respective transmit feed. In other words, the transmission unit is configured to apply the determined set of weight coefficients (i.e., a precoding matrix) to the plurality of signals.

In a preferred embodiment of the disclosure, each terminal has a channel state vector indicative of the channel state information of the respective terminal, and the terminal selection unit is configured for selecting a first terminal in the beam; and selecting, from the terminals in the beam different from the first terminal a predetermined number of terminals in accordance with a distance between the channel state vector of the respective terminal and the channel state vector of the first terminal. Preferably, the terminal selection unit is configured for determining, for each of the terminals in the beam different from the first terminal, a distance between the channel state vector of the respective terminal and the channel state vector of the first terminal. Preferably, the terminal selection unit determines the distance between the absolute value (modulus, or amplitude) of the channel state vector of the respective terminal and the absolute value of the channel vector of the first terminal is determined. Alternatively, the terminal selection unit may be configured for determining, for each of the terminals in the beam different from the first terminal, a distance from the first terminal. Preferably, the terminal selection unit is configured for determining the distance by determining a Euclidean distance for each of the terminals in the beam different from the first terminal. Further preferably, the terminal selection unit is configured for selecting the predetermined number of terminals by selecting terminals with the smallest distance between (the absolute value of) their channel state vector and (the absolute value of) the channel state vector of the first terminal. Yet further preferably, the terminal selection unit is configured to randomly select the first terminal.

In the above, it is of advantage if the equivalent channel state information determination unit is configured for, for each beam: averaging the channel state information of the terminals of the subgroup of terminals in the beam. Preferably, the equivalent channel state information determination unit is configured for determining an arithmetic mean of quantities indicative of the channel state information of the terminals of the subgroup of terminals in the beam.

In another preferred embodiment of the disclosure, each terminal has a channel state vector indicative of the channel state information of the respective terminal, and the terminal selection unit is configured for, for each beam: determining, for each terminal in the beam, a norm of the channel state vector of the terminal; selecting, as a first terminal, a terminal in the beam for which the norm of the channel state vector is largest (maximal); and iteratively performing, until a predetermined number of terminals have been selected:

determining, for each of the terminals in the beam different from terminals that have already been selected, a projection of the channel state vector of the terminal on the subspace spanned by the channel state vectors of the terminals that have already been selected; and selecting, from the terminals in the beam different from the terminals that have already been selected, a terminal for which the channel state vector has the largest projection on the subspace spanned by the channel state vectors of the terminals that have already been selected. Preferably, the terminal selection unit is configured for, whenever a terminal is selected from the terminals in the beam different from the terminals that have already been selected, determining any terminals whose channel state vector has a projection on the channel state vector of the presently selected terminal that after normalization is smaller than a predetermined threshold, and indicating said terminals as not to be considered for selection in future iterations.

In the above, it is of advantage if the terminal selection unit is configured for, for each beam: selecting the channel state information of a terminal of the subgroup of terminals in the beam as the equivalent channel state information representing the subgroup of terminals in the beam.

In yet another preferred embodiment of the disclosure, each terminal has a channel state vector indicative of the channel state information of the respective terminal, and the equivalent channel state information determination unit is configured for: determining a first matrix on the basis of the channel state vectors of the terminals of the subgroups of terminals in the plurality of beams different from the respective beam; regularizing the first matrix to obtain a regularized second matrix; determining a third matrix corresponding to the null space of the second matrix; and determining the equivalent channel state information representing the subgroup of terminals in the respective beam on the basis of the third matrix and the channel state vectors of the terminals of the subgroup of terminals in the respective beam. Preferably, the first matrix comprises the channel state vectors of the terminals of the subgroups of terminals in the plurality of beams different from the respective beam.

In the above, it is of advantage if the equivalent channel state information determination unit is configured for: determining a fourth matrix on the basis of the channel state vectors of the terminals of the subgroup of terminals in the respective beam; regularizing the fourth matrix to obtain a regularized fifth matrix; and determining the equivalent channel state information representing the subgroup of terminals in the respective beam on the basis of the fifth matrix and the third matrix. Preferably, the fourth matrix comprises the channel state vectors of the terminals of the subgroup of terminals in the respective beam. Further preferably, the weight coefficient determination unit is configured for: determining an eigenvector having the largest eigenvalue of a sixth matrix obtainable by multiplying a seventh matrix indicative of the equivalent channel state information representing the subgroup of terminals in the respective beam with its adjoint; and determining a set of weight coefficients that relate the plurality of transmit feeds to a signal among the plurality of signals that is intended for transmission in the respective beam on the basis of the eigenvector and the third matrix.

According to another aspect of the present disclosure, a method for channel estimation in a wireless MU-MIMO communication system employing precoding comprises the steps of: (A) receiving a signal comprising a plurality of waveform components, each waveform component being subdivided into frame units, wherein each frame unit has a first field that is not subjected to precoding and that indicates a start of the respective frame unit and one or more second fields that are not subjected to the precoding and that each comprise a pilot sequence; (B) for a waveform component of the plurality of waveform components, determining a start of a frame unit of the waveform component by searching in the received signal for the first field indicating the start of the frame unit; (C) determining a time offset of the waveform component by referring to the first field in the frame unit and the one or more second fields in the frame unit; (D) re-sampling the waveform component on the basis of the determined time offset to obtain a re-sampled waveform component; (E) determining a frequency offset and a phase offset of the re-sampled waveform component by referring to the one or more second fields in the frame unit of the re-sampled waveform component; and (F) estimating a channel coefficient corresponding to the waveform component by referring to the one or more second fields in the frame unit, on the basis of the determined frequency offset and phase offset of the re-sampled waveform component, wherein the above steps are performed in the order (A) to (F). Preferably, steps (B) to (F) are performed for each of the plurality of waveform components.

In a preferred embodiment of the disclosure, the method further comprises the steps of: (G) generating a replicated frame unit comprising replica of the first field and the one or more second fields of the frame unit of the waveform component on the basis of the determined time offset, frequency offset, phase offset and channel coefficient; and (H) subtracting the replicated frame unit from the received signal, wherein steps (G) and (H) are performed after step (F); and the method further comprises performing steps (A) to (F) again for another waveform component of the received signal after performing step (H). Preferably, steps (B) to (H) are performed for each of the plurality of waveform components. Further preferably, the method further comprises the steps of: (I) estimating a frequency of the received signal; (J) determining a matched filter on the basis of the estimated frequency and filtering the received signal using the determined matched filter; and (K) de-multiplexing the waveform component to separate the first field and the one or more second fields in the frame unit of the waveform component, wherein steps (G) and (H) are performed after step (A) and before step (B), and step (K) is performed after step (B) and before step (C).

By way of this method, synchronization is achieved at the user terminal side despite the background of strong interference by the signals of other beams that is present because of an aggressive frequency re-use scheme. This enables the user terminals to determine their channel vectors, which need to be provided to the GW in order to be able to determine the precoding matrix despite the background of strong interference by the signals of other beams. In particular, by subtracting replica of the first and second fields, channel coefficients may be estimated also for the non-reference waveform components of the received signal that are suppressed by the precoding.

According to another aspect of the disclosure, an apparatus for performing channel estimation in a wireless MU-MIMO communication system employing precoding comprises: a receiving unit configured for receiving a signal comprising a plurality of waveform components, each waveform component being subdivided into frame units, wherein each frame unit has a first field that is not subjected to precoding and that indicates a start of the respective frame unit and one or more second fields that are not subjected to the precoding and that each comprise a pilot sequence; a frame synchronization unit configured for determining a start of a frame unit of a waveform component of the plurality of waveform components by searching in the received signal for the first field indicating the start of the frame unit; a time offset determination unit configured for determining a time offset of the waveform component by referring to the first field in the frame unit and the one or more second fields in the frame unit; a re-sampling unit configured for re-sampling the waveform component on the basis of the determined time offset to obtain a re-sampled waveform component; a frequency/phase offset determination unit configured for determining a frequency offset and a phase offset of the re-sampled waveform component by referring to the one or more second fields in the frame unit of the re-sampled waveform component; and a channel coefficient estimation unit configured for estimating the channel coefficient corresponding to the waveform component by referring to the one or more second fields in the frame unit, on the basis of the determined frequency offset and phase offset of the re-sampled waveform component.

In a preferred embodiment of the disclosure, the apparatus further comprises a replication unit configured for generating a replicated frame unit comprising replica of the first field and the one or more second fields of the frame unit of the waveform component on the basis of the determined time offset, frequency offset, phase offset and channel coefficient; and a subtraction unit configured for subtracting the replicated frame unit from the received signal, wherein the signal obtained by subtracting the replicated frame unit from the received signal is fed back to the frame synchronization unit for further processing. Preferably, the apparatus further comprises a frequency estimation unit configured for estimating a frequency of the received signal; a matched filter unit configured for determining a matched filter on the basis of the estimated frequency and filtering the received signal using the determined matched filter; and a demultiplexing unit configured for de-multiplexing the waveform component to separate the first field and the one or more second fields in the frame unit of the waveform component.

DETAILED DESCRIPTION

Preferred embodiments of the present disclosure will be described in the following with reference to the accompanying figures, wherein in the figures, identical objects are indicated by identical reference numbers. It is understood that the present disclosure shall not be limited to the described embodiments, and that the described features and aspects of the embodiments may be modified or combined to form further embodiments of the present disclosure.

Figure 1:
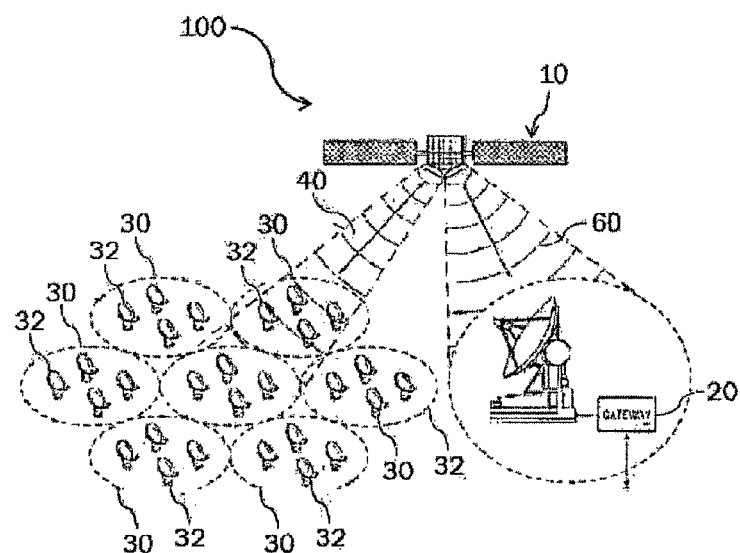
FIG. 1 schematically illustrates an example of a multi-beam satellite communication system to which embodiments of the disclosure may be applied.

FIG. 1 illustrates an exemplary satellite communication system 100 to which the present disclosure may be applied. Although in the following exemplary reference will be made to this system when describing the present disclosure, the disclosure is not limited to such a setup. The satellite system of FIG. 1 includes a satellite 10, one or more gateways (GWs) 20 and a large number of UTs 32. The satellite communication system 100 is designed to provide broadband interactive services to a specific coverage area. The satellite 10 may be located in the geostationary orbit, although alternatively any appropriate satellite orbit may be used. Typically, the satellite payload will be transparent, i.e., the payload only frequency translates and amplifies the signals received on the uplink before routing them to the appropriate downlink beam. Alternatively, the satellite payload may be regenerative, i.e., the payload demodulates and decodes the signals received on the uplink down to base band and then re-encodes and re-modulates the signals before amplifying and routing them to the appropriate downlink beam. The transmitter signal processing techniques according to the disclosure are applicable independently of the payload architecture and independently of whether the transmitter is located on ground or in space.

The system in FIG. 1 represents a multi beam network configured to communicate with a population of UTs 32 distributed across a defined coverage area. Making use of multi-feed antenna technology with N transmitting feeds and one or more parabolic reflectors, the coverage area of the satellite 10 is shaped to project on ground on K beams 30. Both single feed per beam (SFPB) or multi-feed per beam (MFPB) antenna technologies are compatible with the present disclosure. For simplicity, in the rest of the present description a SFPB technology will be assumed, hence N=K will be assumed without intended limitation of the scope of disclosure.

When the satellite payload is transparent, the GW station 20 on ground communicates with the satellite 10 via a feeder link 60 using an appropriate GW antenna subsystem. On the forward channel, i.e., the channel comprising an uplink 60 from the GW 20 to the satellite 10 and a downlink 40 from the satellite 10 to the UTs 32, each GW 20 in the system is transmitting data to a subset of the total number of beams 30, wherein each beam 30 is intended to receive a different information signal. It is to be noted that the present disclosure is applicable to a system comprising any number of GWs, in particular one GW or a plurality of GWs. Depending on the frequency and polarization re-use scheme of the satellite system architecture, each of the K beams 30 may use the same or orthogonal frequency bands and the same or orthogonal (circular or linear) polarizations. Substantial gains due to precoding appear whenever the frequency and polarization are aggressively re-used, e.g., when the full available bandwidth is re-used in every beam 30 in both polarizations (frequency re-use of 1) or when alternating polarizations in successive beams (frequency re-use of 2) are used.

However, if hundreds of spot beams are available in the system, such a frequency re-use scheme will stress the payload resources in terms of mass, power and thermal dissipation beyond the capabilities of even the largest platforms available today. This is mainly because full frequency re-use does not allow for any re-use of on-board high power amplifiers (HPAs) in multiple payload channels. HPAs (typically travelling wave tube amplifiers, TWTAs) are the bulkiest and more power hungry payload units. One possibility to address this issue is to restrict the spot beams in the system to a number that can be handled by the platform (roughly 50 to 60 beams with the current satellite bus capabilities) and provide regional coverage instead of wide continental coverage. Then, for achieving a wider coverage, multiple satellites will need to be employed, each with full frequency re-use and applying precoding separately in each satellite system. It is to be noted that the present disclosure is applicable to a system comprising any number of satellites, in particular one satellite or a plurality of satellites.

Conventionally, precoding is an interference pre-cancelation technique that exploits the spatial degrees of freedom offered by the multiple, i.e., N transmit antenna feeds (transmit feeds, or simply feeds) to serve in each instant K single-antenna UTs installed within each of the K beams, i.e., one UT per beam. A single UT per beam is assumed in each epoch as a result of time division multiplexing (TDM) between the UTs that have made traffic requests in that beam. Multi-user co-channel interference is mitigated by pre-multiplying the transmit signals by appropriate precoding vectors, given that the transmitter has available full knowledge of the UT channels (both with regard to amplitude and phase) in order to be able to carry out this task. This implies that a feedback mechanism between the UTs and the GW serving the K beams is in place. This feedback can be either via a terrestrial (e.g., via ADSL) or via a satellite (e.g., DVB-RCS2) path.

Typically, a satellite communication system as illustrated in FIG. 1 comprises not one but multiple GWs. This is the result of purely spectrum considerations: in particular for the full frequency re-use scheme envisaged for precoding, the spectrum employed by the total number of beams requires the support of many GWs re-using the feeder spectrum. In a multi-GW setting, the GW acquires the channel information relating to the UTs that it transmits to in a specific subset of spot beams through feedback, but has little or no knowledge about the channels of UTs belonging to the rest of the spot beams that it does not transmit to. As a consequence, when forming the precoding vectors intended for its own subset of beams, the signals from the rest of the GWs towards their beam subset will act as non-compensated co-channel interference deteriorating the performance that may be achieved by precoding. This observation leads to the conclusion that the lower the number of GWs in the system, the better the performance of precoding, wherein of course the case of one GW in the system represents the optimal case with respect to the performance of precoding.

Figure 2:
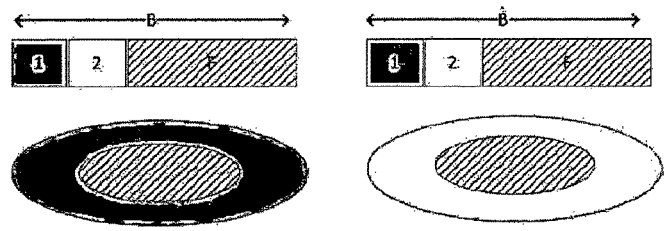
FIG. 2 illustrates an example of a mixed frequency re-use scheme that may be applied in the context of the embodiments of the disclosure.

To lower the number of GWs in the system, one approach is to migrate all feeder links to extremely high frequency (EHF) bands, such as the Q/V-band (50/40 GHz) or even the W-band (80/70 GHz). Another alternative would be to devise a frequency plan, where the available system bandwidth is mixed between a full frequency re-use scheme linked to the central area of each beam and a less aggressive coloring scheme linked to the rest of the beam area. The choice of repeating the same band in the center of every beam and alternating bands in the periphery of the beam has a two-fold advantage: On the one hand precoding performs better for higher SNIR values, and on the other hand it allows to create spatial separation between the co-channel parts of the beams. For example in FIG. 2 a mixed frequency re-use scheme is illustrated to reduce the required spectrum in the feeder link. The total available user link bandwidth B is split into three sub-bands F1, F2 and F. The UTs located in the central areas of the beam will be assigned the sub-band F which is repeated in every beam in the system (full frequency re-use). The UTs located in the periphery of the beam will be alternated between sub-bands F1 and F2 in each beam. The feeder link for these two beams will need to support a spectrum of 2F+F1+F2 instead of 2(F+F1+F2) in case of the full frequency re-use throughout the whole beam. The type of frequency segregation illustrated in FIG. 2 needs to be optimized depending on the specific system architecture in terms of how many sub-bands are employed and/or how they are split (e.g., between F, F1, and F2). Of course, many other type of allocation of the different sub-bands to geographical areas within each beam can also be devised. It is to be understood that this scheme is compatible with the present disclosure.

In the following, a communication system as illustrated in FIG. 1 with N antenna feeds and K beams on ground will be considered for describing the present disclosure, without intended limitation of the scope of disclosure. In this satellite communication system, the general input-output analytical expression for the signal received at a given UT in the k-th beam reads $$y_k = h_k^\dagger x + n_k \quad (1)$$

where $A^\dagger$ (or $A^H$) denotes the conjugate transpose of matrix (or vector) A, $h_k^\dagger$, is a 1×N vector composed of the complex channel coefficients (indicative of antenna gains, propagation losses and phase shifts) between the UT and the N transmit antenna feeds of the satellite, x is a N×1 vector of transmitted symbols and $n_k$ is the independent identically distributed (i.i.d.) zero mean additive white Gaussian noise (AWGN) measured at the receive antenna of the UT in the k-th beam. This baseband block fading model can be described in compact matrix form as $$y = Hx + n \quad (2)$$

where the total channel state matrix (channel matrix) is the ensemble of each one vector channel per beam, i.e., $H=[h_1, h_2, \ldots, h_K]^\dagger$. It is to be noted that in case of a transparent payload architecture where the precoding vectors are applied on ground at the GW, the very high performance (large HPA and antenna) of the GW renders the feeder link between the GW and the satellite almost ideal. This enables considering mostly the user link from the satellite to the UTs and disregarding the feeder link at least for the amplitudes in the channel matrix.

Next, linear precoding that may be applied in the context of the disclosure will be described. Linear precoding is a multi-user precoding technique that separates user data streams in specific spatial dimensions. The term "linear" refers to the linear transmit processing, i.e., the precoding matrix. Although not capacity achieving, linear techniques can perform close to the optimal channel capacity otherwise given by the non-linear Dirty Paper Coding (DPC) under specific optimization algorithms like the ones proposed by the embodiments of the present disclosure.

Let $s_k$ denote a unit power (i.e., normalized power) symbol (an input signal, i.e., a signal to be transmitted to the k-th beam), $w_k$ denote a N×1 normalized precoding vector (a vector of weight coefficients), and $p_k$ denote a scaling factor, respectively corresponding to the UT in the k-th beam. The scaling factor is associated to the k-th signal (i.e., to information towards the UT in the k-th beam). Since the output of each antenna will depend on all the input signals, the total transmit signal when linear precoding is applied will read $$x = \sum_{k=1}^{K} \sqrt{p_k} w_k s_k \quad (3)$$

Thus, when precoding is employed, Eq. (1) will become $$y_k = h_k^\dagger \sqrt{p_k} w_k s_k + h_k^\dagger \sum_{j \neq k} \sqrt{p_j} w_j s_j + n_k \quad (4)$$

where the first term of the summation refers to the useful signal at the UT in the k-th beam and the second term refers to the interferences experienced by the UT in the k-th beam from the other beams. The unit norm column vector $w_k$ with dimension N×1 is the precoding vector associated to the UT in the k-th beam and is the k-th column of a total precoding matrix $W=[w_1, w_2, \ldots, w_K]$. The resulting SNIR at the UT in the k-th beam is given by $$SNIR_k = \frac{p_k |h_k^\dagger w_k|^2}{1 + \sum_{j \neq k} p_j |h_k^\dagger w_j|^2} \quad (5)$$

When precoding is employed, determining the optimal precoding vectors is tedious. A very common approach that is also employed in the context of the present disclosure is described below.

Based on the theory of uplink/downlink duality discussed in N. Jindal, S. Vishwanath, and A. Goldsmith, "On the duality of Gaussian multiple-access and broadcast channels," IEEE Trans. Inf. Theory, vol. 50, no. 5, pp. 768-783, May 2004, the precoder can be designed as a linear minimum mean square error (MMSE) filter $$W = [I_N + H^\dagger P H]^{-1} H^\dagger \quad (6)$$

where the optimal power allocation P (diagonal K×K matrix) under per-antenna constraints is given by solving the dual uplink problem. For the system model presently assumed, and further assuming a single feed per beam payload architecture (i.e., N=K), always equal power will be allocated to the multiple satellite antenna feeds.

Next, multicast precoding will be described. The present disclosure introduces novel linear precoding designs (i.e., selection of terminals and derivations of the precoding matrix) based on the algorithms described below. These algorithms differ from algorithms known in the prior art in that they satisfy the need to provide for improved capacity in spite of the precoder being required to accommodate multiple UTs per beam which are bundled within a single frame. The need for such an approach might be arising from the physical layer framing. Such an approach towards linear precoding, which can be referred to as Multicast Precoding, has not been investigated for terrestrial or satellite systems so far, either because these systems have no comparable constraint in their physical layer specification or because it has been implicitly assumed that the constraint is dealt with at a higher layer.

For example, the DVB-S2 standard achieves a large part of its efficiency in broadband interactive point-to-point systems by statistically multiplexing multiple UTs belonging to the same beam in each frame. Specifically, out of the set of UTs that have requested capacity, the scheduler associated with each beam groups the UTs with similar SNIR characteristics into the same base band frame (or codeword) so that identical physical layer transmission modes (ModCods) are applied to them. This concept originally was designed for maximizing the encapsulation efficiency of the long physical layer frames (16 k or 64 k) due to LDPC (low-density parity check) channel coding.

Figure 3:
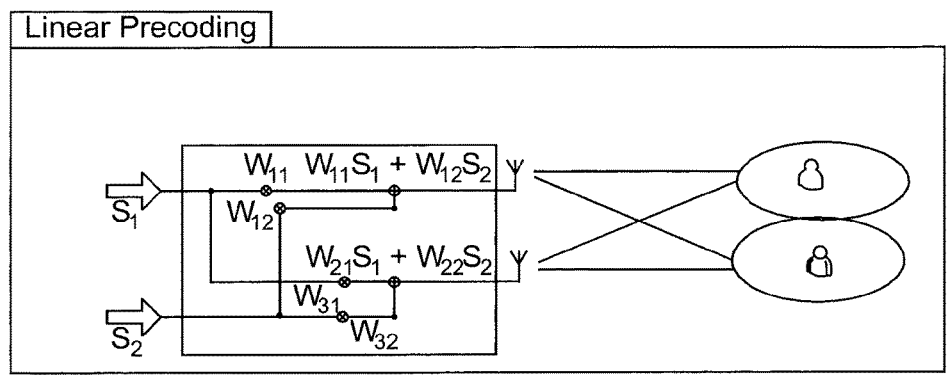
FIG. 3 is an example of conventional single UT precoding over a system with channel dimensions 2×2 employed in the prior art.
Figure 4:
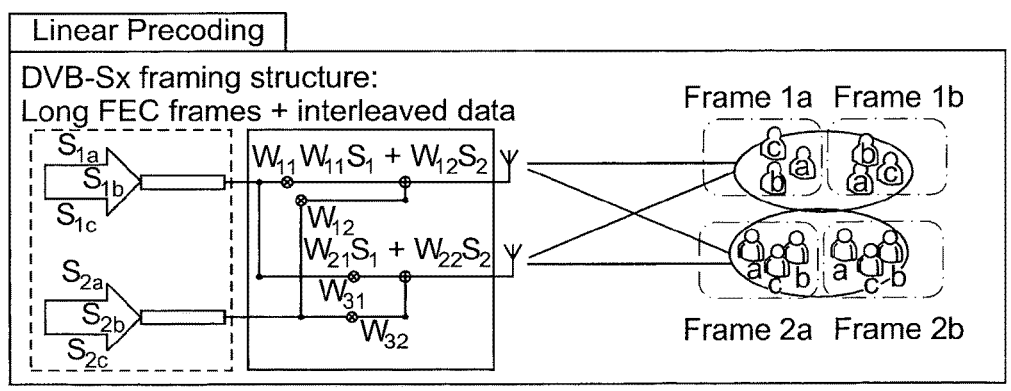
FIG. 4 is an example of multicast precoding over a system with channel dimensions 2×2 according to embodiments of the disclosure.

However, from the precoding point of view, this approach towards framing within DVB-S2 is adding an important practical constraint since it implies that the precoder cannot be designed on a channel-by-channel basis (conventional channel based precoding). Rather, a multicast based precoder needs to be designed based on the multiple UT channels that are encapsulated in the same frame. The difference between a conventional single UT based precoding and a multicast precoding approach can be understood by contrasting FIG. 3 with FIG. 4. Both figures depict a simplified multi-beam satellite system with N=2 antenna feeds forming K=2 spot beams on ground. In FIG. 3, a precoding matrix addressing one UT in each beam is calculated and applied over the same time resource (frame), which is the optimal way of applying precoding since it corresponds to a single instant of the channel matrix. On the other hand, for multicast precoding in FIG. 4 the same precoding matrix is kept over multiple UTs (a, b, c) during the frame period Xa and over multiple other ones during the frame period Xb, X=1, 2, that is over different channel matrix instances. All UTs belonging to the same frame (a, b, c) are served by the same precoding matrix.

Figure 5:
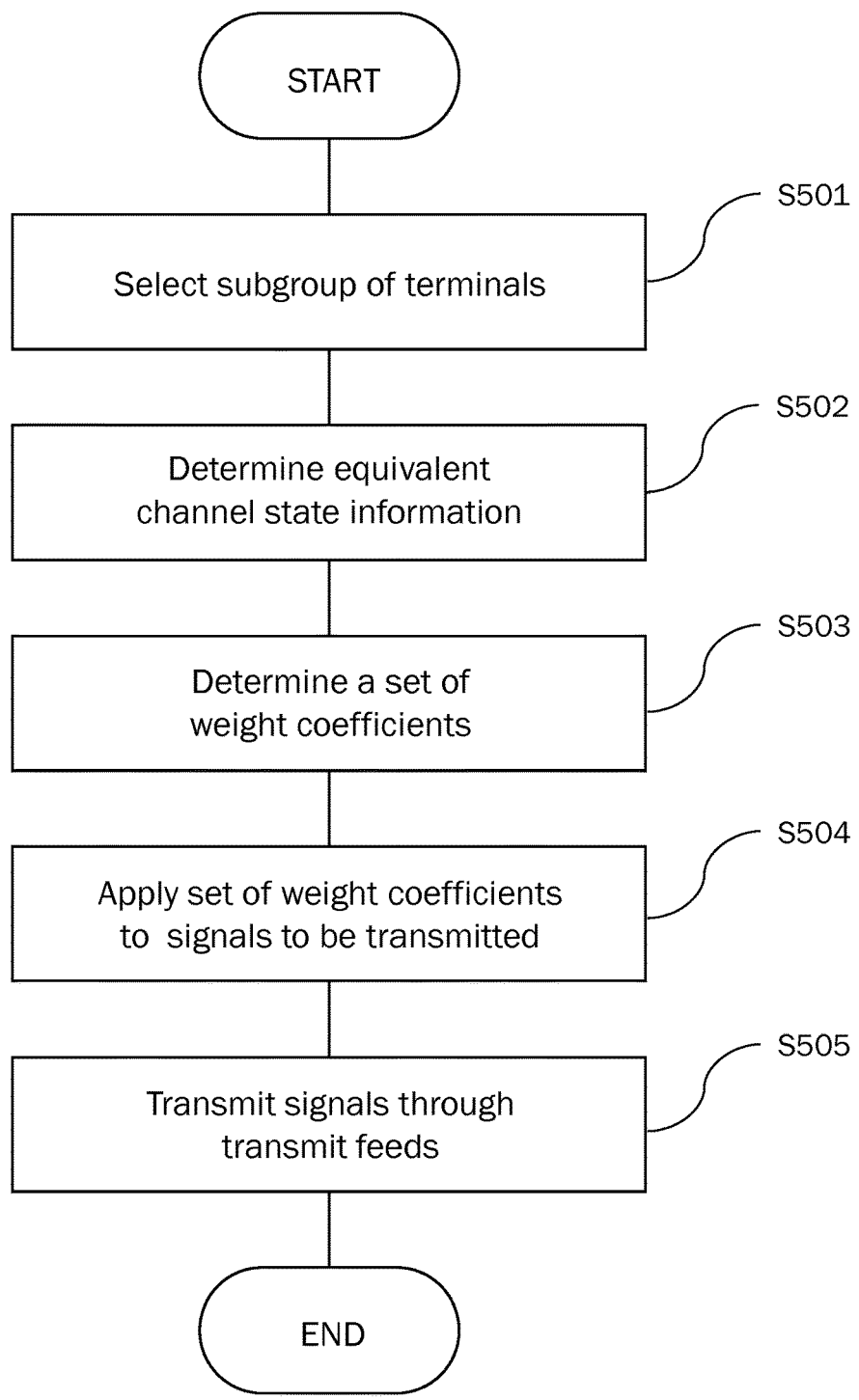
FIG. 5 is a flow chart illustrating processing for determining the precoding matrix according to embodiments of the disclosure.

Compared to the single instant case, the above multicast precoding scheme taken for itself is clearly suboptimal as regards, e.g., SNIR. Algorithms according to different embodiments of the present disclosure that serve to mitigate these disadvantages are described next. In particular, the disclosure provides methods (algorithms) for wirelessly transmitting data to a plurality of terminals (users) in each of a plurality of beams through a plurality of transmit feeds, and in particular for calculating the multicast precoding matrix. An outline of these methods which are particularly applicable to interactive broadband satellite communication systems is given in the flow chart of FIG. 5. The method steps illustrated in FIG. 5 are carried out for each frame (i.e., for each time resource) and are common to each of the different embodiments described below. While certain steps illustrated in FIG. 5 are concretized by these embodiments, it is understood that the steps that are not explicitly mentioned in the description of these embodiments are nevertheless performed.

At step S501, for each of the K beams, two or more terminals among the terminals in the beam are selected as a subgroup of terminals. This selection proceeds based on channel state information of the plurality of terminals in the respective beam. Therein, the channel state information of a given terminal is information indicative of an alteration of a signal through transmission between a respective transmit feed and the respective terminal in terms of amplitude and phase, for each of the N transmit feeds. Accordingly, the channel state information of a terminal is represented by a complex channel state coefficient for each of the plurality of transmit feeds. These channel state coefficients form a complex N×1 channel state vector (sometimes also referred to as channel gain vector, or simply channel vector or channel). The channel state vector for an i-th terminal in the k-th beam at a position $q_{k,i}$ will be denoted by $h_k(q_{k,i})$. It is understood that the overall number of terminals in the beam from which the subgroup of terminals is selected may particularly relate to those terminals in the beam that are scheduled for receiving data in the present frame.

At step S502, for each subgroup that has been determined in step S501 (one for each beam, i.e., K subgroups in total), channel state information for (i.e., representing) the subgroup (equivalent channel state information, or joint channel state information) is determined based on the channel state information of the individual terminals of at least one of the plural subgroups (one for each beam) that have been determined in step S501. In the simplest case, the equivalent channel state information for a subgroup is determined based on the channel state information of the individual terminals of this very subgroup, that is, if $N_u$ terminals are comprised by each subgroup, the equivalent channel state information $\bar{h}_k$ for the subgroup in the k-th beam is given by a function $\bar{h}_k = f(h_k(q_{k,1}), h_k(q_{k,2}), \ldots, h_k(q_{k,N_u}))$. The equivalent channel information representing the subgroup in the k-th beam may be determined, e.g., by taking an arithmetic mean of the channel state information $h_k(q_{k,i})$, i=1, ..., $N_u$, of the terminals of the subgroup or by selecting channel state information of an individual terminal within the subgroup as the equivalent channel state information representing the subgroup. The K pieces of equivalent channel state information (one for each subgroup) are represented by equivalent channel state vectors $\bar{h}_1, \bar{h}_2, \ldots, \bar{h}_k$, or in more compact form by equivalent channel matrix $\bar{H}$, where $\bar{H} = [\bar{h}_1, \bar{h}_2, \ldots, \bar{h}_K]^\dagger$. In an alternative case, the equivalent channel state information representing the subgroup of terminals in the k-th beam may be determined based on the channel state information of the terminals of the subgroups in all of the beams, i.e., the equivalent channel state information $\bar{h}_k$ for the subgroup in the k-th beam may be given by a function $$\bar{h}_k = f(h_1(q_{1,1}), \ldots, h_1(q_{1,N_u}), \ldots, h_k(q_{k,1}), \ldots, h_k(q_{k,N_u}), \ldots, h_K(q_{K,1}), \ldots, h_K(q_{K,N_u})).$$

Then, at step S503, a set of weight coefficients $w_{ij}$, i=1, ..., N; j=1, ..., K, that relate the plurality of signals $s_k$ intended for transmission in the plurality of beams to the plurality of transmit feeds, is determined based on the equivalent channel state information of the plural subgroups that has been determined in step S502. That is, determination of the set of weight coefficients is based on one piece of equivalent channel state information for each beam, or in other words, K pieces of equivalent channel state information in total. For K beams and N transmit feeds, N·K complex weight coefficients are determined at this step. These N·K weight coefficients form a complex weight matrix that is commonly referred to as precoding matrix W. In the first case in step S502 in which the equivalent channel state information of a subgroup of terminals is determined based on the channel state information of the terminals of this very subgroup, the precoding matrix is jointly determined, simultaneously taking into account the K pieces of equivalent channel state information, e.g., by calculating the precoding matrix W as indicated in Eq. (6). In the alternative case of step S502 in which the equivalent channel state information representing a given subgroup of terminals is determined based on the channel state information of the terminals of the plural subgroups, a precoding vector $w_k$ may be first determined for a given beam on the basis of the equivalent channel state information representing the subgroup of terminals in the given beam.

At step S504, the set of weight coefficients is applied to the plurality of signals $s_k$, k=1, ..., K that are intended for transmission in the plurality of beams, as is indicated in Eq. (3). Thereby, a plurality of (weighted) signals $x_n$, n=1, ..., N intended for transmission through the plurality of transmit feeds are obtained. It is noted that the scaling factors $p_k$ in Eq. (3) might be set to unity at this step, if desired. At step S505, the weighted signals $x_n$ are transmitted through their corresponding transmit feeds. Steps S504 and S505 could be summarized as transmitting the plurality of signals $s_k$, k=1, ..., K that are intended for transmission in the plurality of beams through the plurality of transmit feeds in accordance with respective weight coefficients among the set of weight coefficients. That is, for each signal among the plurality of signals $s_k$, k=1, ..., K that are intended for transmission in the plurality of beams, and for each transmit feed among the plurality of transmit feeds, the respective signal is transmitted through the respective transmit feed weighted with a weight coefficient that relates the respective signal to the respective transmit feed. In other words, the precoding matrix W is applied to the vector $s = [s_1, s_2, \ldots, s_K]^T$ to obtain the vector of $x = [x_1, x_2, \ldots, x_N]^T$ of weighted signals, i.e., $x = Ws$. If desired, scaling factors $p_k$ could be applied by inserting a matrix $\text{diag}(\sqrt{p_1}, \sqrt{p_2}, \ldots, \sqrt{p_K})$ in the above matrix multiplication, $x = W\text{diag}(\sqrt{p_1}, \sqrt{p_2}, \ldots, \sqrt{p_K})s$, in accordance with Eq. (3).

By selecting the UTs based on certain criteria, these linear precoding schemes applied over all channels of the terminals of a given subgroup during a frame period achieve substantial precoding gains compared to conventional four-color multi-beam systems. In the following, three novel schemes are described, combining precoder design and user selection algorithms. It is to be noted that these schemes (methods) relate to concretizations of some or all steps S501 to S505 described above. Therein, it is understood that specific implementations of these steps disclosed in connection with these schemes may be combined with each other, e.g., the specific implementation of step S501 of one of the schemes may be combined with the specific implementation of step S502 of another one of the schemes, and so forth.

In the specific embodiments described below, it will be assumed that each physical layer frame (e.g., in the DVB-S2 or DVB-S2X standards) contains data addressing $N_u$ UTs belonging to the same beam that form a so-called user cluster (subgroup of terminals). If a receiving UT is located at position of the k-th beam, k=1, ..., K; i=1, ..., $N_u$, the channel state vector for this UT may be expressed as $h_k(q_{k,i})$, as indicated above, and the channel state vectors for the respective i-th UTs in the K beams can be collected in the channel matrix denoted by $H_{[i]}$, $i=1, \ldots, N_u$. This slightly different notation highlights that now a third dimension is considered, namely the indexing of the $N_u$ UTs within each beam whose data is put into the same frame container. The overall satellite communication channel can be represented by a set of $N_u$ equations $$y_{[i]} = H_{[i]}x + n_{[i]}, \quad i=1, \ldots, N_u \tag{7}$$

It should be stressed that it may not be possible to distinguish the transmitted symbols of the $N_u$ UTs into $N_u$ distinct periods within the frame, as the corresponding bits will most probably be interleaved within a single codeword. Therefore, the implementation of precoding requires a single precoding matrix W that is independent of the user index i to be used at the GW transmitter.

A specific algorithm (method) according to an embodiment of the disclosure will be described next. This algorithm is referred to by the inventors as Geographic User Clustering. According to this embodiment, in step S502 of FIG. 5, the equivalent channel state information of the subgroup of terminals in the k-th beam (equivalent channel state information representing the subgroup of terminals) is determined on the basis of the channel state information of the individual terminals of the subgroup of terminals in the k-th beam, in particular by taking the average (arithmetic mean) of the channel state information of the individual terminals of the subgroup of terminals in the k-th beam. That is, the equivalent channel state vector (a quantity indicative of the equivalent channel state information) of the subgroup in the k-th beam is given by the average of the channel state vectors of the terminals of the subgroup in the k-th beam, i.e., by $$\bar{h}_k = \frac{1}{N_u} \sum_{i=1}^{N_u} h_k(q_{k,i}).$$

In other words, the equivalent channel matrix representing the user clusters to be input to the precoder is the average of the individual channel matrices, $$\bar{H} = \frac{1}{N_u} \sum_{i=1}^{N_u} H_{[i]} \tag{8}$$

Of course, the present embodiment is not limited to taking the arithmetic mean, and also other averaging methods are conceivable.

Then, in step S503 in FIG. 5, equivalent channel matrix $\bar{H}$ replaces channel matrix H in Eq. (6) when determining the precoding matrix W. Of course, alternative schemes for linear precoding apart from MMSE for determining the precoding matrix W on the basis of the equivalent channel matrix (or, more general, on the basis of the equivalent channel state information representing the plural subgroups) are also feasible.

Clearly, the performance of the above precoding algorithm depends on the differences between the equivalent channel matrix $\bar{H}$ defined in Eq. (8) and the individual channel matrices $H_{[i]}$, for $i=1, \ldots, N_u$. The greater the differences, the worse the system performance. One way to limit such differences is to specifically design the user clusters in order to make the channel matrices $H_{[i]}$ sufficiently similar. The similarity criterion adopted in this embodiment is geographic, i.e., based on geographically dividing the beams into sub-regions to which the UTs that are to be merged in the same user cluster need to belong.

Figure 6:
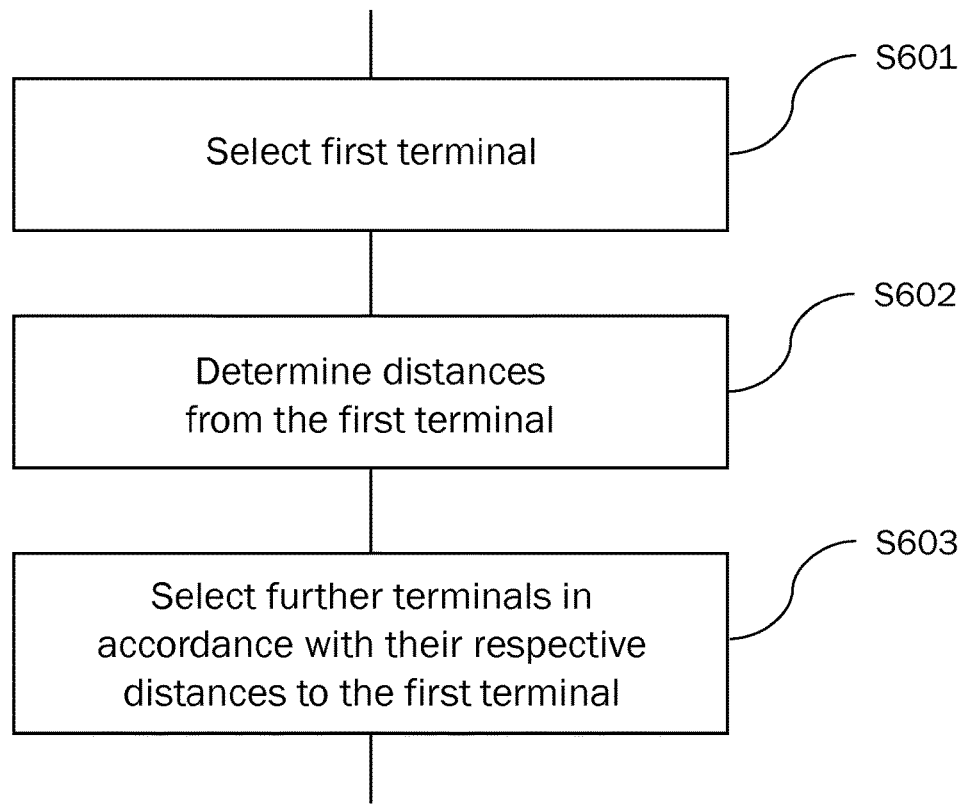
FIG. 6 is a flow chart illustrating processing for UT selection according to an embodiment of the disclosure.

FIG. 6 illustrates a flow chart of the specific implementation of step S501 according to this embodiment. The steps described below are carried out for each of the K beams, unless indicated otherwise.

At step S601, a first terminal is selected among the plurality of terminals in the beam, for instance, for the k-th beam a terminal at a position $q_{k,l}$ is selected as the first terminal. The first terminal may be selected randomly. Alternatively, the first terminal may be selected as the terminal whose channel state vector maximizes a given (matrix) norm, such as the Frobenius norm $\|\cdot\|_F$, where the Frobenius norm of a m×n matrix A is defined as $\|A\|_F := \sqrt{\sum_{i=1}^{m} \sum_{j=1}^{n} |\alpha_{ij}|^2}$. It is understood that a plurality of further methods for selecting the first terminal are feasible and that the present disclosure shall not be limited to the examples given above.

At step S602, for each of the terminals in the beam different from the first terminal, a distance between (an absolute value, or modulus, of) the channel state vector of the respective terminal and the (absolute value of the) channel state vector of the first terminal is determined. In other words, for the k-th beam the available UT locations $q_{k,i}$, $i \neq l$, in the beam are looped over and the respective distances between $|h_k(q_{k,i})|$ and $|h_k(q_{k,l})|$ are calculated. Preferably, the Euclidean distance $\|\cdot\|_E$ is determined at this step. Accordingly, the available UT locations $q_{k,i}$, $i \neq l$, are looped over and the Euclidean distances $$d_{i,l} = \| |h_k(q_{k,l})| - |h_k(q_{k,i})| \|_E \tag{9}$$

are calculated. However, also other distance measures may be employed, such as the p-norm distance for arbitrary p or the infinity norm distance. It is to be noted that for the above looping over available UT locations, actual values of the locations $q_{k,i}$, $i \neq l$ do not need to be known. Incidentally, a large contribution to the channel state vectors stems from propagation between the transmitter and the respective terminal, and at least the absolute value of the channel state vectors depends strongly on the relative position of the transmitter and the terminal. Hence it could be said that the distances determined at this step correspond to distances between (positions of) the terminals and (the position of) the first terminal. In fact, if the positions of the terminals in the beam are numerically known, a distance from the first terminal could be determined for each of the terminals in the beam different from the first terminal. In this case, for the k-th beam the available UT locations $q_{k,i}$, $i \neq l$, in the beam would be looped over and the respective distances to position $q_{k,l}$ would be calculated, e.g., Euclidean distances $\|\cdot\|_E$. Accordingly, Euclidean distances $d_{i,l} = \|q_{k,l} - q_{k,i}\|_E$ would be calculated at this step.

At step S603, a predetermined number of terminals different from the first terminal are selected in accordance with their respective distances to the first terminal (i.e., distances between channel vectors or absolute values of channel vectors). Here, the user cluster is to comprise $N_u$ terminals in total, so that ($N_u-1$) terminals remain to be selected at this step. Preferably, this selecting of the predetermined number of terminals involves selecting terminals with the smallest distance to the first terminal (i.e., smallest distances between channel vectors or absolute values of channel vectors). In other words, the clustering is completed by adding the ($N_u-1$) terminals having user locations $q_k$ corresponding to the ($N_u-1$) lowest values in the set $\{d_{i,l}\}$, where i runs through the available location indexes of terminals not yet included in the user cluster.

If more than one user cluster is to be determined at step S501 in FIG. 5, the method according to this embodiment may further comprise saving the user cluster with the selected user locations and removing the selected user locations from the set of available user locations, and repeating the above steps S601 to S603 until all terminal locations that have requested traffic in the beam have been processed. As indicated above, it will be assumed here that only one user cluster per beam is selected.

Applying a distance criterion such as the Euclidean distance criterion, to the matrix rows of the channel matrix (i.e., to the channel state vectors) produces user clusters containing terminals at geographically close user locations that have sufficiently similar channel state vectors (i.e., sufficiently similar channel state information).

Figure 7:
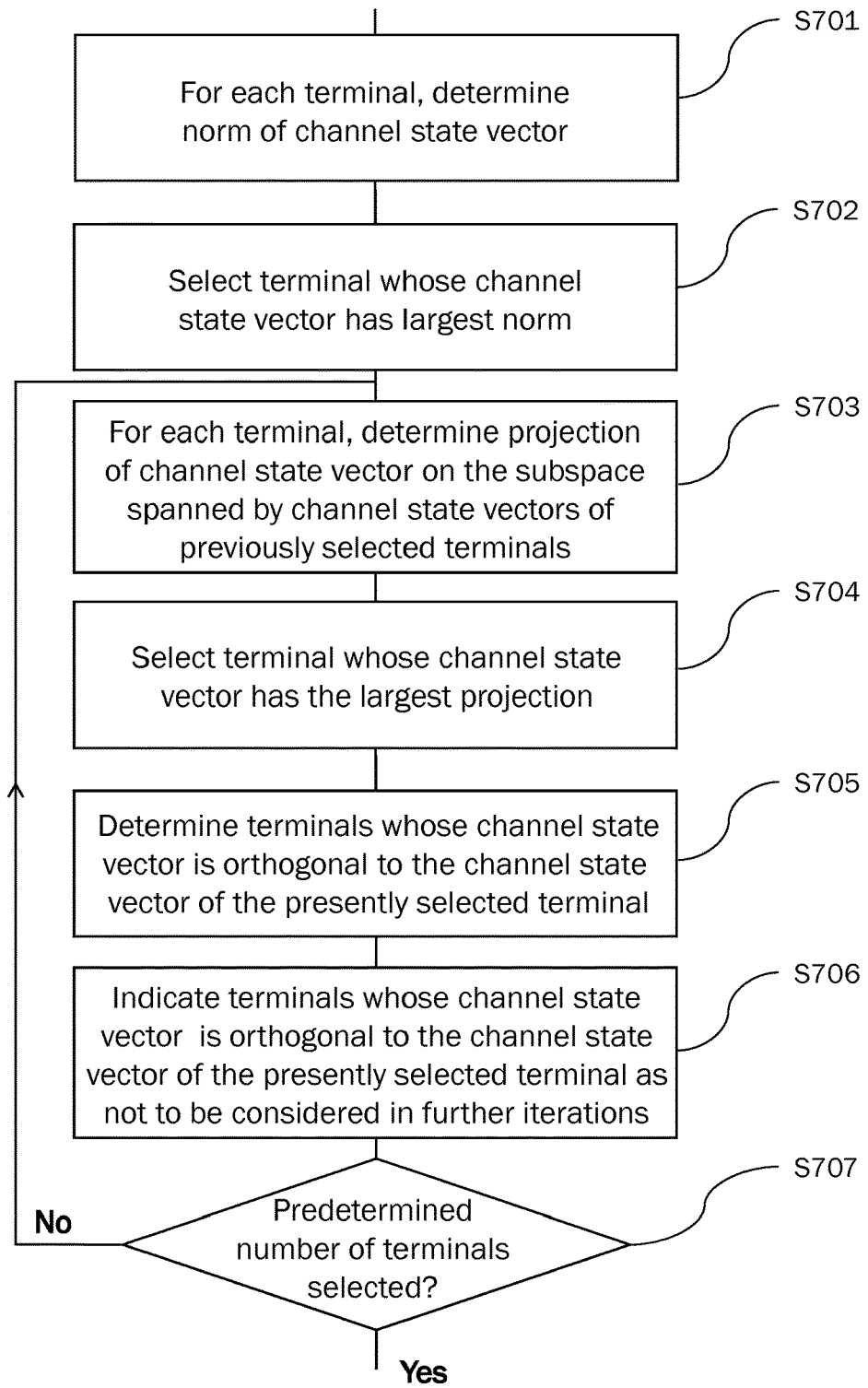
FIG. 7 is a flow chart illustrating processing for UT selection according to another embodiment of the disclosure.

A specific algorithm (method) according to another embodiment of the present disclosure will be described next. This algorithm is referred to as Parallel User Selection by the inventors. This heuristic user scheduling algorithm accounts not only for the channel gains, but also for the channel phases when selecting the terminals of the user cluster. The underlying scheduling criterion is based on the level of user correlation. Using the terminology of multiuser MIMO communications, this correlation can be measured in terms of orthogonality of the complex vector channels (channel state vectors). Typically, in order to maximize the similarity of two vectors, one needs to maximize their inner product. Additionally, the user selection process needs to account for the level of correlation between sets of users. Therefore, the key step in the proposed user selection algorithm lies in measuring the level of orthogonality between a user and a set of users. Since one cannot search the prohibitively large vector space composed of the channel state vectors of all users to be served (i.e., users scheduled for data transmission), the iterative algorithm according to this embodiment involves calculating the vector subspaces spanned by the (channel state vectors of the) set of users selected in the previous iterations of the algorithm. FIG. 7 illustrates a flow chart of the specific implementation of step S501 in FIG. 5 according to this embodiment. The steps described below are carried out for each of the K beams, unless indicated otherwise.

At step S701, a norm (matrix norm) of the channel state vector (i.e., the channel state vector indicative of the channel state information) for each terminal in the beam is calculated. In a preferred embodiment, the Frobenius norm $\|\cdot\|_F$ is calculated for each terminal in this step. At step S702, the terminal in the beam for which the norm of the channel state vector is largest among the terminals in the beam is selected as a first terminal. In other words, the terminal at position $q_{k,1}$ is selected as the first terminal, wherein $$q_{k,1} = \mathrm{argmax}_l \|h_k(q_{k,l})\|_F \qquad (10)$$

If necessary, the elements of the precoding matrix are then updated with the selected channel and the corresponding terminal is removed from the pool of terminals to be considered for selection in the remainder of the selection process.

Steps S701 and S702 represent the starting point (i.e., first iteration) of an iterative process that comprises steps S703 to S707 and that is repeated until a desired (i.e., predetermined) number of terminals has been selected. In the present case, $N_u$ terminals are to be selected in total, so that the iterative process needs to be run through for an additional ($N_u-1$) times.

At step S703, for each of the terminals in the beam different from those terminals that have already (i.e., previously) been selected, a projection of the channel state vector of the terminal on the subspace spanned by the channel state vectors of the terminals that have previously been selected is determined. At step S704, a terminal for which the channel state vector has the largest projection on the subspace spanned by the channel state vectors of the terminals that have already been selected is selected from the terminals in the beam that remain available for selection, i.e., from the terminals in the beam different from the terminals that have already been selected. In other words, in each iteration $i=2 \ldots N_u$, it is looped over the available UT locations $q_{k,l}$ in the beam and the terminal (user) with the maximum channel projection onto the subspace spanned by the users already is determined and selected, or more precisely, the terminal whose channel state vector has the maximum channel projection onto the subspace spanned by the channel state vectors of the terminals that have already been selected in previous iterations is determined and selected. Denoting the channel (channel state vector) of the terminal that is to be selected in the current iteration by $g_i$, this channel is formally given by $$g_i(q_{k,i}) = \mathrm{argmax}_l \left( \left\| h_k^H(q_{k,l}) \Sigma_{j=1}^{i-1} \frac{g_j g_j^H}{\|g_j\|^2} \right\|_2 \right) \qquad (11)$$

In Eq. (11), the term $$\Sigma_{j=1}^{i-1} \frac{g_j g_j^H}{\|g_j\|^2}$$

represents the subspace spanned by the channels of terminals selected in previous iterations, $g_i$ is the argument, i.e., the channel with the maximum projection to this subspace among all currently available channels $h_k(q_{k,l})$, and $\|\cdot\|_2$ is the second norm (p-norm with p=2), which coincides with the Frobenius norm of a vector. If necessary, the elements of the precoding matrix are then updated with the selected channel and the corresponding terminal is removed from the pool of terminals to be considered for selection in the remainder of the selection process.

Steps S705 and S706 are optional steps that may be performed to increase the performance of the overall selection process by reducing the number of terminals that are to be considered for selection in each iteration of steps S703 and S704. To accelerate the algorithm, at step S705, those terminals in the beam are determined whose channel state vector has a projection on the channel state vector of the terminal selected at step S704 that after normalization is smaller than a predetermined threshold α. At step S706, any terminals identified at step S705 are indicated as not to be considered for selection in future iterations, i.e., these terminals are removed from the pool of terminals to which steps S703 and S704 of subsequent iterations are applied. In other words, in steps S705 and S706 terminals that are orthogonal (or rather sufficiently orthogonal) to the one selected, and therefore orthogonal to the subspace spanned by the previously selected terminals, are discarded from the candidate pool terminals. In analytic form, this can be phrased as $$S_{i+1} = \left\{ \ell \in S_i \, \middle| \, \frac{h_k(q_{k,\ell}) g_i^H(q_{k,i})}{\|h_k(q_{k,\ell})\| \cdot \|g_i(q_{k,i})\|} > \alpha \right\} \qquad (12)$$

where $S_i$ denotes the set of users available for selection in the current iteration, and α is a parameter that controls performance versus running time of the algorithm. In more detail, this step defines the set of users eligible for selection during the next iteration. As is evident from Eq. (12), this set is the intersection of the current set with the set of users whose projection on the currently chosen channel $g_i^H(q_{k,i})$ is greater than α. Therefore, the terminals whose projection on the channel selected in the current iteration is smaller than α are discarded and the search space of the next iteration is reduced. These optional steps are particularly relevant for very high numbers of terminals per beam, for which a high value of α will greatly reduce the running time of the algorithm by constraining the large search space to the potential channels that are most relevant.

At step S707, it is checked whether $N_u$ terminals have already been selected. If $N_u$ terminals have already been selected (step S707 returns Yes), the process (i.e., step S501 in FIG. 5) ends. If further terminals need to be selected (step S707 returns No), the process returns to step S703 for a further iteration. Needless to say, although not illustrated in FIG. 7, the process also ends if no terminals available for selection are remaining in the beam.

The above selection algorithm is applicable to any precoding method. The simplest one is the low complexity equivalent MMSE precoding introduced earlier in the description. Accordingly, the equivalent channel state information representing the subgroup of terminals in the k-th beam may be determined on the basis of the channel state information of the individual terminals of the subgroup of terminals in the k-th beam, in particular by taking the average (arithmetic mean) of the channel state information of the individual terminals of the subgroup of terminals in the k-th beam, as described above in connection with the Geographic User Clustering algorithm, see Eq. (8). To provide a consolidated heuristic investigation of the problem, instead of using Eq. (8) to calculate the channel matrix that is used for determining the precoding matrix, the following precoding design can be considered instead, $$\tilde{H} = H_{[eq]} \quad (13)$$

where $H_{[eq]}$ includes only one representative user (terminal) in each beam. In other words, in the present embodiment, determining the (equivalent) channel state information of the subgroup of terminals may involve, for each beam, selecting the channel state information of a terminal of the subgroup of terminals in the beam as the channel state information of the subgroup of terminals in the beam. Therein, the representative terminal may be selected randomly among the terminals of the user cluster (subgroup of terminals). This approach is beneficial when the lack of geographic proximity comes into play. This equivalent channel matrix may be employed for the calculation of the MMSE precoding matrix as described in Eq. (6). It is explicitly noted that this choice of (equivalent) channel state information of the subgroup of terminals in the beam may also be applied to the Geographic User Clustering algorithm described above, especially when the channel vectors of the terminals in the subgroup of terminals are sufficiently similar.

In addition to the low complexity MMSE solution according to Eq. (6), the theoretically optimal (from a signal processing point of view, regardless of implementation complexity) multicast precoding may also be considered. Multicasting has been considered for interference cancellation in terrestrial systems, e.g., in N. Sidiropoulos, T. Davidson, and Z.-Q. Luo, "Transmit beamforming for physical-layer multicasting," IEEE Trans. Signal Process., vol. 54, no. 6, pp. 2239-2251, 2006, and in E. Karipidis, N. Sidiropoulos, and Z.-Q. Luo, "Quality of service and max-min fair transmit beamforming to multiple co-channel multicast groups," IEEE Trans. Signal Process., vol. 56, no. 3, pp. 1268-1279, 2008. On the other hand, its application on precoding without changing the framing structure of given telecommunication standards has not been considered. However, such a consideration is emanated by the inherent nature of satellite communications, where the communication standards are optimized to cope with long propagation delays and guarantee scheduling efficiency by framing multiple users per transmission. To model the frame-based precoding problem in the terminology of multi-group multicasting, let there be a total of $1 \leq G \leq N$ multicast groups, one corresponding to each beam, with $\mathfrak{S} = \{\mathcal{G}_1, \mathcal{G}_2, \ldots \mathcal{G}_G\}$ being the collection of index sets and $\mathcal{G}_k$ the set of UTs that belong to the k-th multicast group, with k=1, ..., G. Each UT belongs to only one group, thus $\mathcal{G}_i \cap \mathcal{G}_j = \varnothing$, ∀i, j=1 ... G. Then, the optimal precoding matrix can be calculated by solving the following optimization problem where the power emitted by each satellite antenna feed is fixed to $P_n$.

$$\mathcal{F}: \max_{t, \{w_k\}_{k=1}^G} t$$

$$\text{subject to } \frac{1}{\gamma_i} \frac{|w_k^\dagger h_i|^2}{\sum_{l \neq k}^G |w_l^\dagger h_i|^2 + \sigma_i^2} \geq t,$$

$$\text{and to } \left[\sum_{k=1}^G w_k w_k^\dagger\right]_{nn} \leq P_n,$$

$$\forall n \in \{1 \ldots N_t\},$$

The optimum linear precoding vectors under per antenna power constraints are given by solving the optimization problem $\mathcal{F}$. Despite the fact that in general this problem is Non-deterministic Polynomial-time hard (NP-hard) to compute, accurate solutions are obtainable using the well-established convex optimization methods of semi-definite relaxation, Gaussian randomization and bisection.

A specific algorithm (method) according to yet another embodiment of the disclosure will be described next. This algorithm is referred to by the inventors as Null Space Precoding and relates to steps S502 and S503 of FIG. 5.

Figure 8:
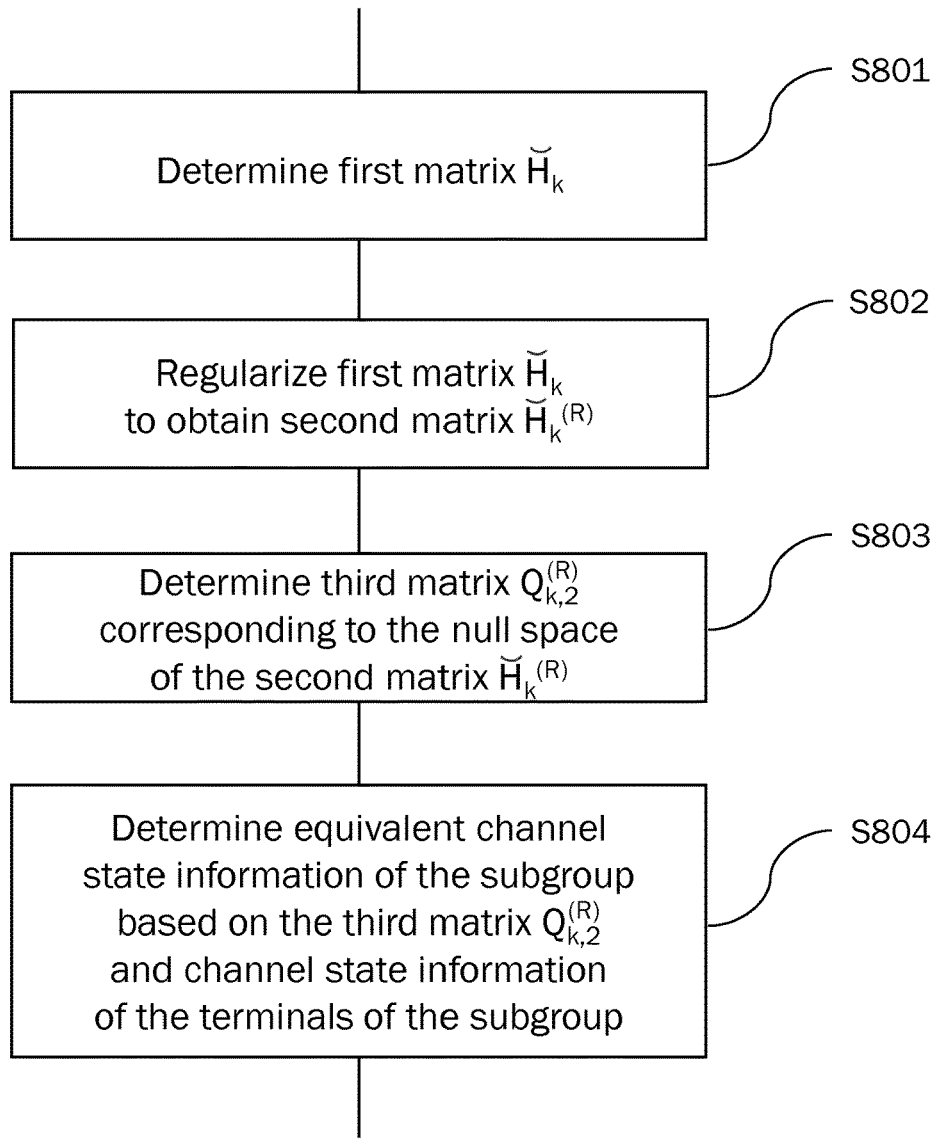
FIG. 8 is a flow chart illustrating processing for determining equivalent channel information of a subgroup of UTs according to another embodiment of the disclosure.
Figure 9:
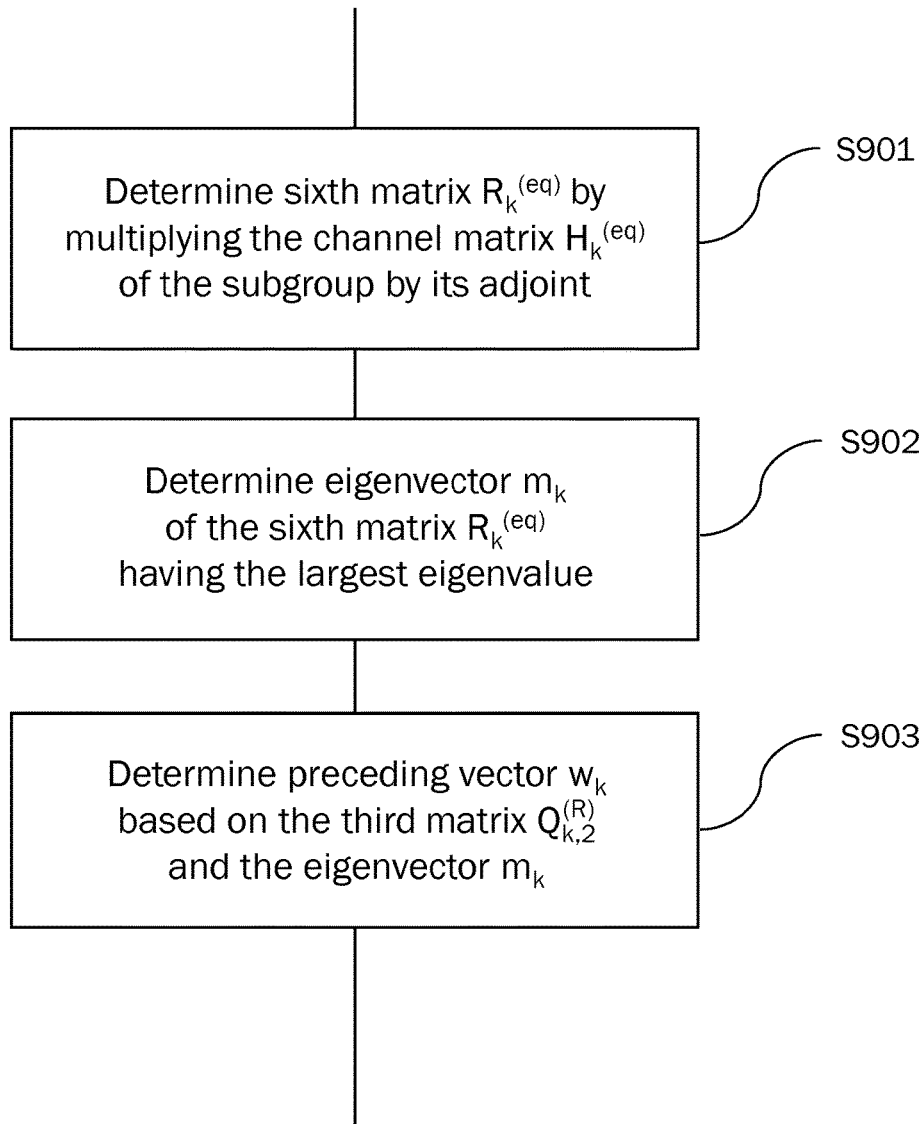
FIG. 9 is a flow chart illustrating processing for determining the precoding matrix according to the embodiment of FIG. 8.

For step S501, i.e., the step of terminal selection, any of the selection algorithms described above may be employed in this embodiment, for instance the selection algorithm illustrated in FIG. 6, or the selection algorithm illustrated in FIG. 7. However, the algorithm according to the present embodiment does not depend on a particular selection algorithm. In fact, the $N_u$ terminals of the subgroup of terminals could also be selected arbitrarily (randomly). In order to increase the achievable throughput of the overall system it is desirable that the received interference from signals intended for the terminals in different beams is rejected so that the SINR is large enough to support large data rates. Thus, in the multi-beam multicast scenario, it is convenient that the precoding design aims to somehow pre-cancel the transmitted interference. In contrast to the aforementioned methods, the precoding method according to this embodiment aims to completely pre-null the interference. This is done by computing the null space channel matrix for each beam, and afterwards, computing the precoding vector. FIG. 8 illustrates a flow chart of the specific implementation of step S502, and FIG. 9 illustrates a flow chart of the specific implementation of step S503, according to this embodiment. These steps described below are carried out for each of the K beams, unless indicated otherwise.

FIG. 8 illustrates an implementation of the step of determining, for each beam, (equivalent) channel state information of the subgroup of terminals in the beam on the basis of the channel state information of the terminals of at least one of the plural subgroups of terminals. At step S801, a first matrix (channel matrix) comprising the channel state vectors of the terminals of the subgroups of terminals in each of the plurality of beams different from the respective beam is determined. For the k-th beam the following matrix $$\tilde{H}_k = [H_1^T, \ldots, H_{k-1}^T, H_{k+1}^T, \ldots, H_K^T]^T \quad (14)$$

is constructed as the first matrix, where $H_k \in \mathbb{C}^{N_u \times N}$ is a matrix that collapses the channel vectors from the user cluster (subgroup) located in the k-th beam, i.e., that comprises, as its rows, the adjoints of the channel vectors of the terminals of the subgroup of the k-th beam, i.e., $H_k = [g_{k,1}, g_{k,2}, \ldots, g_{k,N_u}]^\dagger$, where $g_{k,l}$, $l=1, \ldots, N_u$ (of dimensions 1×N) denote the channel state vectors of the terminals of the subgroup in the k-th beam. Then, $\tilde{H}_k \in \mathbb{C}^{N_u(K-1) \times N}$ is a matrix containing channel vectors from all beams except for the k-th beam k (i.e., the channel matrix of the k-th beam has been extracted and removed). The idea now is to construct the precoding vector of the k-th beam by means of first blocking the space dimension generated by $\tilde{H}_k$. In this way, the symbol transmitted to the k-th beam will not be received by the other beams. Obtaining the null projection matrix of $\tilde{H}_{k,k}$ can be done in several ways, although it is recognized that the fastest way is the one which relies on the QR decomposition (QR factorization). This decomposition yields two different matrices $Q_{k,1}$, $Q_{k,2}$ $$\tilde{H}_k = [Q_{k,1}, Q_{k,2}] \begin{bmatrix} R_k \\ 0 \end{bmatrix} \quad (15)$$

where $Q_{k,1}$ (of dimensions $N_u(K-1) \times N$) is a unitary matrix, $R_k$ (of dimensions N×N) is an upper triangular matrix, 0 is a null matrix of appropriate dimensions and $Q_{k,2}$ (of dimensions $N_u(K-1) \times (N_u(K-1)-N)$) corresponds to the span of the null space (kernel) of $\tilde{H}_{k,k}$. Unfortunately, as has been found by the inventors, $\tilde{H}_{k,k}$ is full rank and thus, the dimension of its null space is zero. Consequently, the initial objective of completely pre-canceling the interference needs to be relaxed.

Accordingly, at step S802, the first matrix is regularized to obtain a regularized second matrix (channel matrix). In general, a regularized version of the channel matrix may be constructed by $$H^{(R)} = HH^H + \frac{1}{P}I \quad (16)$$

where P is the transmit power of the transmit feeds, that is assumed to be equal for all transmit feeds in the present description. This regularization, which is commonly referred to as Tikhonov regularization, is widely used and can be generalized by giving an arbitrary multiplying factor to the identity matrix. The regularization scheme may be further generalized by adding an arbitrary matrix instead of the identity matrix multiplied by a multiplying factor. Remarkably, this regularized version of the channel does not have any physical meaning but a mathematical one. From now on, $H^{(R)}$ instead of H will be considered. In other words, the second matrix is given by $\overline{H_k^{(R)}}$, which is the regularized version of the first matrix $\tilde{H}_k$ and which may be obtained by $$\check{H}_k^{(R)} = \tilde{H}_k^H \tilde{H}_k + \frac{1}{P}I.$$

Of course, also here generalizations of the Tikhonov regularization as described above may be considered.

At step S803, a third matrix (channel matrix) corresponding to the null space of the second matrix is determined, i.e., the null projection matrix for $\overline{H_k^{(R)}}$ is determined. In order to find the null space of $\overline{H_k^{(R)}}$, the QR decomposition of this matrix has to be computed. In the notation defined above, the QR decomposition reads $$\check{H}_k^{(R)} = [Q_{k,1}^{(R)}, Q_{k,2}^{(R)}] \begin{bmatrix} R_k^{(R)} \\ 0 \end{bmatrix} \quad (17)$$

The matrix $\overline{H_k^{(R)}}$, due to the regularization, will never be full rank. Therefore, a null projection matrix space will exist in this approach. The null projection matrix for $\overline{H_k^{(R)}}$ is denoted as $Q_{k,2}^{(R)}$ (third matrix) and is obtained by performing the QR decomposition of matrix $\overline{H_k^{(R)}}$ as indicated in Eq. (17). This pre-processing matrix $Q_{k,2}^{(R)}$ will not completely reject the interference but it will significantly reduce it, leading to very high performance, as will be discussed later.

Then, at step S804, the channel state information of the subgroup of terminals (equivalent channel state information representing the subgroup of terminals) in the respective beam is determined on the basis of the third matrix and channel state vectors indicative of the channel state information of the terminals of the subgroup of terminals in the respective beam. In more detail, this involves determining a fourth matrix (channel matrix) comprising channel state vectors indicative of the channel state information of the terminals of the subgroup of terminals in the respective beam, regularizing the fourth matrix to obtain a regularized fifth matrix (channel matrix), and determining the equivalent channel state information representing the subgroup of terminals in the respective beam on the basis of the fifth matrix and the third matrix. That is, once the regularized blocking matrix $Q_{k,2}^{(R)}$ (third matrix) is computed, the next step is to compute the k-th precoding vector $w_k$. As the rank of matrix $Q_{k,2}^{(R)}$ is always $N_u$, this matrix can be interpreted as an equivalent channel of the k-th beam so that now it must only be aimed to treat the following beam channel matrix (seventh matrix)

$$H_k^{(eq)} = H_k^{(R)} Q_{k,e}^{(R)} \quad (18)$$

Where channel matrix $H_k^{(R)}$ (fifth matrix) is the regularized version of the channel matrix $H_k$ (fourth matrix) corresponding to the k-th beam which is given by $H_k = [g_{k,1}, g_{k,2}, \ldots, g_{k,N_u}]^\dagger$, where $g_{k,l}$, $l=1, \ldots, N_u$ denote the channel state vectors of the terminals of the subgroup in the k-th beam. It is to be noted that $\widetilde{H_k^{(R)}} Q_{k,2}^{(R)}=0$, this is, $Q_{k,2}^{(R)}$ projects to the null space of $\widetilde{H_k^{(R)}}$. In this case, there is no longer spatial notion of the channel but a geometrical one. Indeed, the equivalent channel $H_k^{(eq)}$ (which is indicative of equivalent channel state information representing the subgroup of terminals in the k-th beam) is the one seen by first a blocking matrix $Q_{k,2}^{(R)}$ and a posterious projection to the regularized channel matrix.

FIG. 9 illustrates an implementation of the step of determining a set of weight coefficients that relate the plurality of transmit feeds to a plurality of signals that are intended for transmission in the plurality of beams on the basis of the equivalent channel state information representing the plural subgroups of terminals. In FIG. 9, at step S901, a sixth matrix (a channel matrix) is determined by multiplying the seventh matrix (a channel matrix) indicative of the equivalent channel state information representing the subgroup of terminals in the respective beam with its adjoint. At step S902, an eigenvector of the sixth matrix is determined having the largest eigenvalue. Thus, the approach selected by the Null Space Precoding method for obtaining an efficient precoding vector concerning the isolated channel matrix in Eq. (18) is to compute the eigenvector associated with the largest eigenvalue of the sixth matrix which is given by $$R_k^{(eq)} = H_k^{(eq),H} H_k^{(eq)} \qquad (19)$$

for the k-th beam. This vector is expressed as $m_k$, obtained by means of an eigen decomposition of the sixth matrix $R_k^{(eq)}$.

Then, at step S903, a set of weight coefficients is determined that relate the plurality of transmit feeds to a signal among the plurality of signals that is intended for transmission in the respective beam on the basis of the eigenvector $m_k$ and the third matrix $Q_{k,2}^{(R)}$. This set of weight coefficients corresponds to a weight vector (precoding vector) $W_k$ and is given by $$w_k = \frac{Q_{k,2}^{(R)} m_k}{\|Q_{k,2}^{(R)} m_k\|_2} \qquad (20)$$

In order to obtain the precoding matrix, this process has to be repeated for k=1, . . . K, i.e., for each beam. In other words, for computing the precoding matrix, this procedure has to be performed K times (in accordance with number of beams). It is important to remark that this process can be performed in parallel, leading to a high reduction of the computational time. The precoding matrix W is then given by W=[$w_1, w_2, \ldots, w_k$].

Next, implementation aspects of multicast precoding according to the present disclosure will be described. The implementation details of multicast precoding in a broadband multi-beam satellite system depend on the extent to which the technique is supported by relevant standards. In terms of standardization developments, the DVB standard or the recently issued extension DVB-S2X thereof are provided with an optional specification that provides the necessary framing and signaling support to interference management techniques, as is described in Annex E of ETSI EN 302307-2, Digital Video Broadcasting (DVB), "Second generation framing structure, channel coding and modulation systems for Broadcasting, Interactive Services, News Gathering and other broadband satellite applications; Part II: S2-Extensions (52-X)", 2014, which is hereby incorporated by reference in its entirety. Thereby, all elements necessary to support precoding according to the above embodiments in terms of the physical layer have been put in place in these standards.

The implementation of precoding techniques in broadband interactive satellite systems requires an air interface, which supports a number of special features including a regular channel framing structure, specific pilots and unique words for synchronization aid as well as a feedback signaling message from the UTs to the GW. All these features have been included in the DVB-S2X standard. The super-frame structure of the DVB-S2X standard supports orthogonal Start of Super-Frame (SOSF) and pilot fields by using Walsh-Hadamard sequences. A set of orthogonal sequences can be assigned to co-channel carriers within a multi-spot beam network (one unique sequence per beam). These features allow the UT to estimate the channel responses from the antenna feeds down to its receiver to a very low SNIR value. The beam-specific orthogonal sequence enables the terminal to uniquely associate the channel estimate to the beam index.

The format specifications 2 and 3 of the super-frame (the ones to be used for precoding), also foresee an additional precoded pilot field to aid amplitude and carrier phase recovery in support of the precoded data detection. A specifically adapted multi-level sequence with the same modulation format as the one of the following payload data is used in these pilots in order to ease the task of receiver synchronization. Another important feature of the formats 2 and 3 of the super-frame is the possibility of maintaining a constant and aligned (i.e., aligned over co-channel carriers) PLFRAME size, using the Bundled PL-FRAME concept by which DVB-S2 codewords with the same ModCod are conveniently grouped to resort to a regular length framing structure. Users (terminals) using the same precoding coefficients are opportunistically scheduled within a Bundled PL-FRAME. The alignment of such frames over different co-channel carriers helps the GW to reduce its computational burden.

Figure 10:
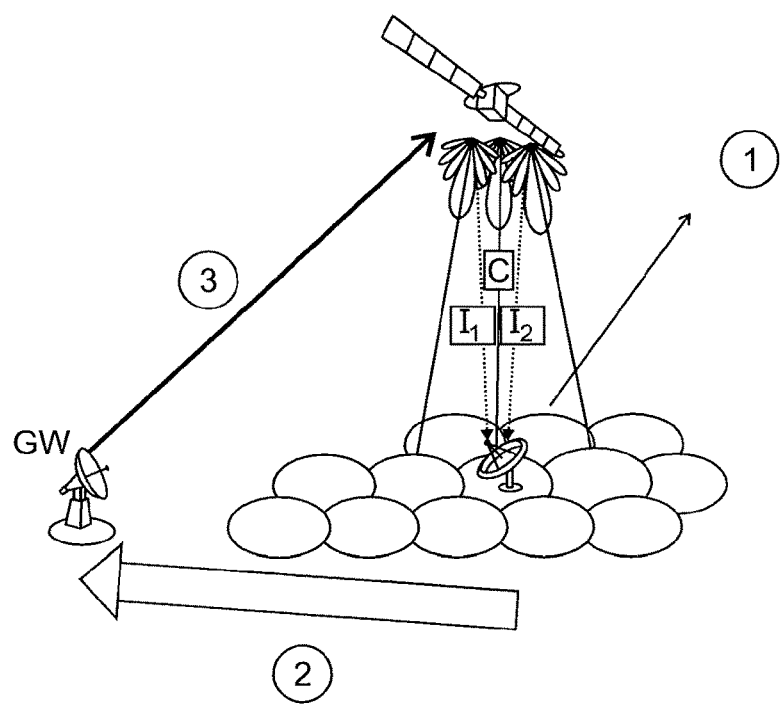
FIG. 10 schematically illustrates an example of a periodic procedure for collecting the complex channel gains from the UTs and feeding them back to the GW that may be applied in the context of the embodiments of the disclosure.
Figure 11:
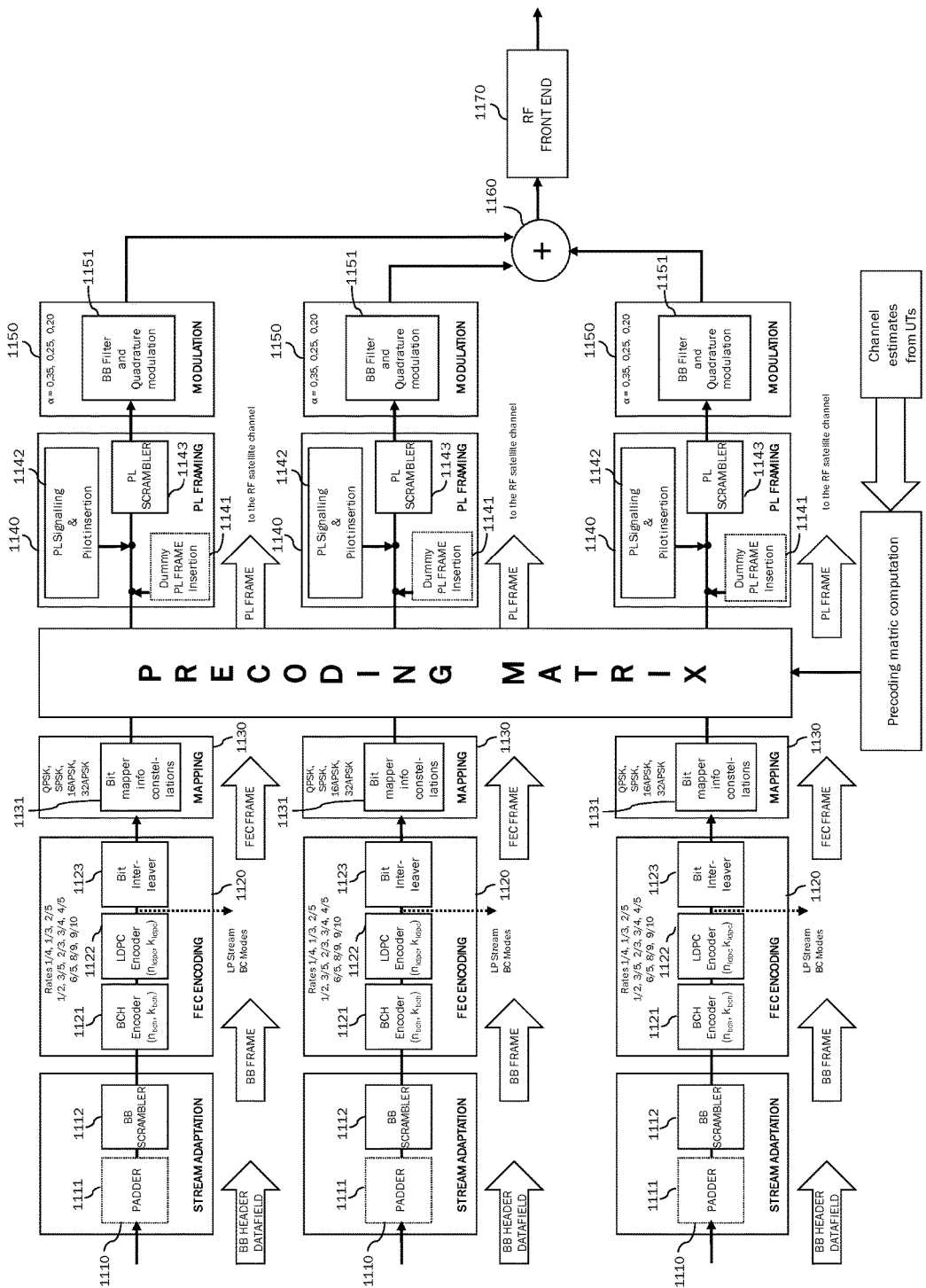
FIG. 11 schematically illustrates a positioning of the precoding function according to the embodiments of the disclosure in the signal processing sequence carried out on the transmitter side.

FIG. 10 and FIG. 11 describe how the actual implementation of the precoding technique can be carried out for a DVB-S2X based multi-beam network. FIG. 10 is a schematic representation of the main functional tasks to be carried out in support of precoding. First (see (1) in FIG. 10), the UTs estimate the end-to-end channel frequency response for C, I1 and I2, i.e., Hi1, Hi2 and Hi3 for up to 10 to 15 interference channel responses for full frequency re-use systems. Second (see (2) in FIG. 10), the end-to-end channel frequency response, e.g., Hi1, Hi2, . . . , HiN (N complex numbers) are reported to the GW on the return channels when significant changes are detected, in the worst case about once every second in deep fading conditions similarly to Adaptive Coding and Modulation (ACM) signaling. Third (see (3) in FIG. 10), the GW computes the channel precoding matrix on the basis of the reported channel responses reported by each terminal in the coverage. Thus, each UT estimates a number of complex channel coefficients corresponding to the most significant interfering beams (assumedly 10 to 15 as indicated above). These complex numbers are signaled back to the GW using the signaling message described in Annex E.4 of ETSI EN 302307-2 with a maximum rate of one message every 500 ms. End-to-end system effects (e.g., payload, Radio Frequency (RF) propagation, terminal) that influence the quality of this estimation process during each estimation period will be described later.

In FIG. 11, a schematic functional bock diagram of a DVB-S2X GW modulator supporting precoding is illustrated. Therein, reference numeral 1110 indicates a stream adaptation block, 1120 indicates a Forward Error Correction (FEC) encoding block, 1130 indicates a mapping block, 1140 indicates a Physical Layer (PL) framing block, 1150 indicates a modulation block, 1160 indicates an adder block, and 1170 indicates an RF front end block. The stream adaptation block 1110 comprises a padder 1111 and a Base Band (BB) scrambler 1112, the FEC encoding block 1120 comprises a Bose-Chaudhuri-Hocquenghem (BCH) encoder 1121, a LDPC encoder 1122, and a bit interleaver 1123, the mapping block 1130 comprises a constellation mapper 1131 for mapping bits into constellations, PL framing block 1141 comprises a dummy frame insertion block 1141, a PL signaling and pilot insertion block 1142, and a PL scrambler 1143, and the modulation block 1150 comprises a BB filter and quadrature modulation block 1151. For further details it is referred to ETSI EN 302307-2. The block precoding matrix is applied right after the constellation mapper 1131 of the bank of modulators and is activated on all the fields of the DVB-S2X super-frame (exemplarily embodying a frame unit) except for the dispersed orthogonal pilots and the start of the super-frame. The module accepts as an input the precoding matrix coefficients that are repeatedly computed by the GW processor based on the feedbacks that the UTs transmit to the GW through the return link (either satellite or terrestrial-based).

Next, the synchronization procedure according to the present disclosure that is performed at the terminal side (receiver side) and that is a necessary prerequisite for being able to determine the channel state information will be described. First, the relevant notation will be defined. The received signal at the k-th UT (or rather, a UT in the k-th beam) is modeled as $$y_k(t) = \sum_{n=1}^{N} r_{kn}(t) + n_k \quad (21)$$

where $$r_{kn}(t) = h_{kn}(t) e^{j2\pi \Delta f_{kn} t} x_n(t - \Delta \tau_{kn}) \quad (22)$$

is the waveform component received from the n-th antenna feed, $\Delta f_{kn}$ and $\Delta \tau_{kn}$ account for the unknown frequency and time misalignment between the signal transmitted by the n-th antenna feed and the k-th UT frequency and time reference, respectively.

Let us consider an indexing function i(n) taking values in the set S={0, 1, 2, . . . , N}, i.e i(n)∈S={1, 2, . . . , N}, n=1, 2, . . . , N, where i(n)=0 means that the n-th waveform component is not considered in the processing. Each UT shall proceed with the following general synchronization/estimation operations:

a) identify the frame boundary, i.e., frame synchronization, for the i(n)-th waveform component, n=1, . . . , N;
b) synchronize frequency, phase, and time for the i(n)-th waveform component, n=1, . . . , N; and
c) perform channel estimation for the i(n)-th waveform component, n=1, . . . , N to be sent back to the gateway.

To achieve this aim, the k-th UT (UT in the k-th beam) shall:

i) perform and apply a coarse frequency estimation by means of a non data aided estimator on $y_k(t)$, e.g., through the algorithm proposed in P. Kim, R. Pedone, M. Villanti, A. Vanelli-Coralli, G. E. Corazza, D.-I. Chang, D.-G. Oh, "Robust frame synchronization for the DVB-S2 system with large frequency offsets," Int. J. Satell. Commun. Network., vol. 27, no. 1, pp. 35-52, 2009 (Kim et al.), which is hereby incorporated by reference;

ii) for each waveform i(n), n=1, 2, . . . , N, perform frame synchronization, e.g., through algorithms described in the aforementioned reference, or in R. Pedone, M. Villanti, A. Vanelli-Coralli, G. E. Corazza, P. T. Mathiopoulos, "Frame synchronization in frequency uncertainty", IEEE Transactions on Communications, vol. 58, no. 4, pp. 1235-1246, April 2010 (Pedone at el.), which is hereby incorporated by reference, if pilot fields or unique words are present in the frame format, to identify frame boundaries. Non-coherent post detection integration can be applied to cope with the residual frequency uncertainty and the time varying phase impairment. For those waveform components for which frame synchronization is not successfully achieved, i(n) is set to zero so as to exclude them from the subsequent processing; and iii) for each waveform i(n), n=1, 2, . . . , N for which frame synchronization is successfully achieved, perform fine time tracking, phase and frequency tracking, and channel estimation.

For the super-frame structure described in Annex E of ETSI EN 302307-2, the present disclosure provides two possible realizations of the UT synchronization for a system employing precoding that are hereafter described with reference to FIG. 12, FIG. 13, and FIG. 14. While the below description is provided for the exemplary case of a communication system employing the DVB-S2 (or DVB-S2X) standard, the present disclosure is not limited to such communication systems.

Figure 12:
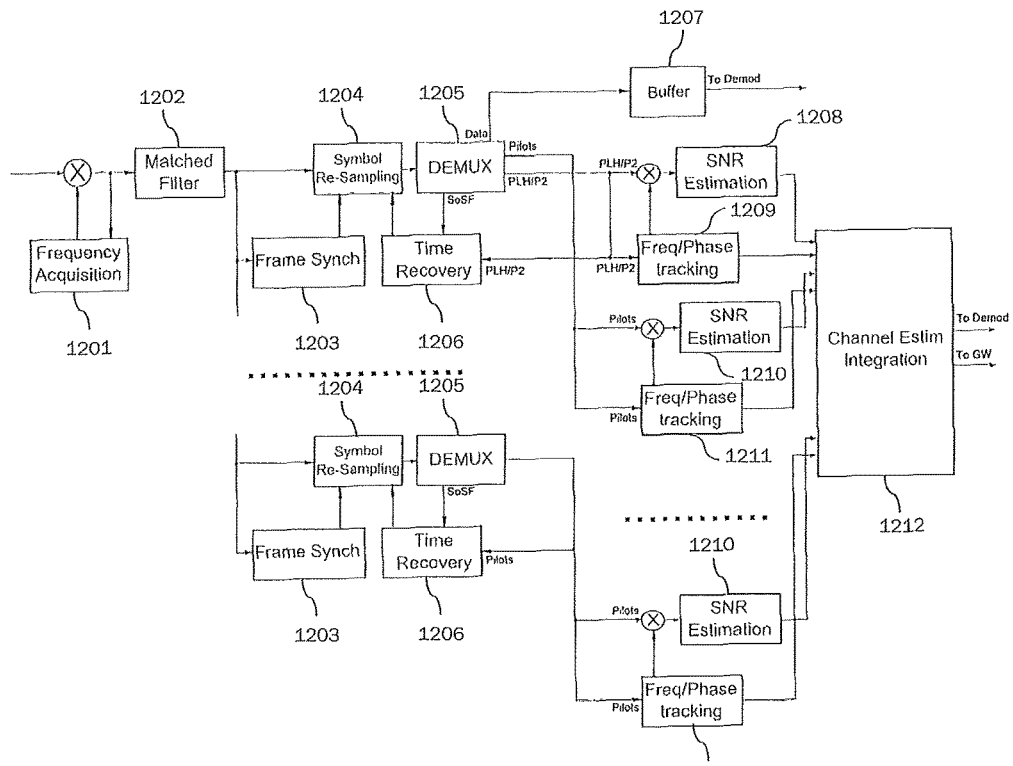
FIG. 12 illustrates a schematic block diagram of an apparatus configured for performing the synchronization procedure at a UT according to embodiments of the disclosure.

FIG. 12 illustrates a schematic block diagram of an apparatus for performing the synchronization procedure at a UT according to embodiments of the disclosure. The apparatus illustrated in FIG. 12 comprises a frequency acquisition unit 1201 (a frequency estimation unit), a matched filter 1202 (a matched filter unit), one or more frame synchronization units 1203, one or more symbol re-sampling units 1204 (resampling units), one or more demultiplexers 1205 (demultiplexer units), one or more time recovery units 1206 (time offset determination units), a buffer 1207, a first SNR estimation unit 1208, a first frequency/phase tracking unit 1209 (a first frequency/phase offset determination unit), one or more second SNR estimation units 1210, one or more second frequency/phase tracking units 1211 (second frequency/phase offset determination units), and a channel estimation integration unit 1212 (a channel coefficient estimation unit). It is to be noted that apart from the frequency acquisition unit 1201 and the matched filter 1202, which commonly process all waveform components, N branches of blocks are provided, as illustrated in FIG. 12. Alternatively, if the N waveform components are processed sequentially, a single branch would be sufficient.

Figure 13:
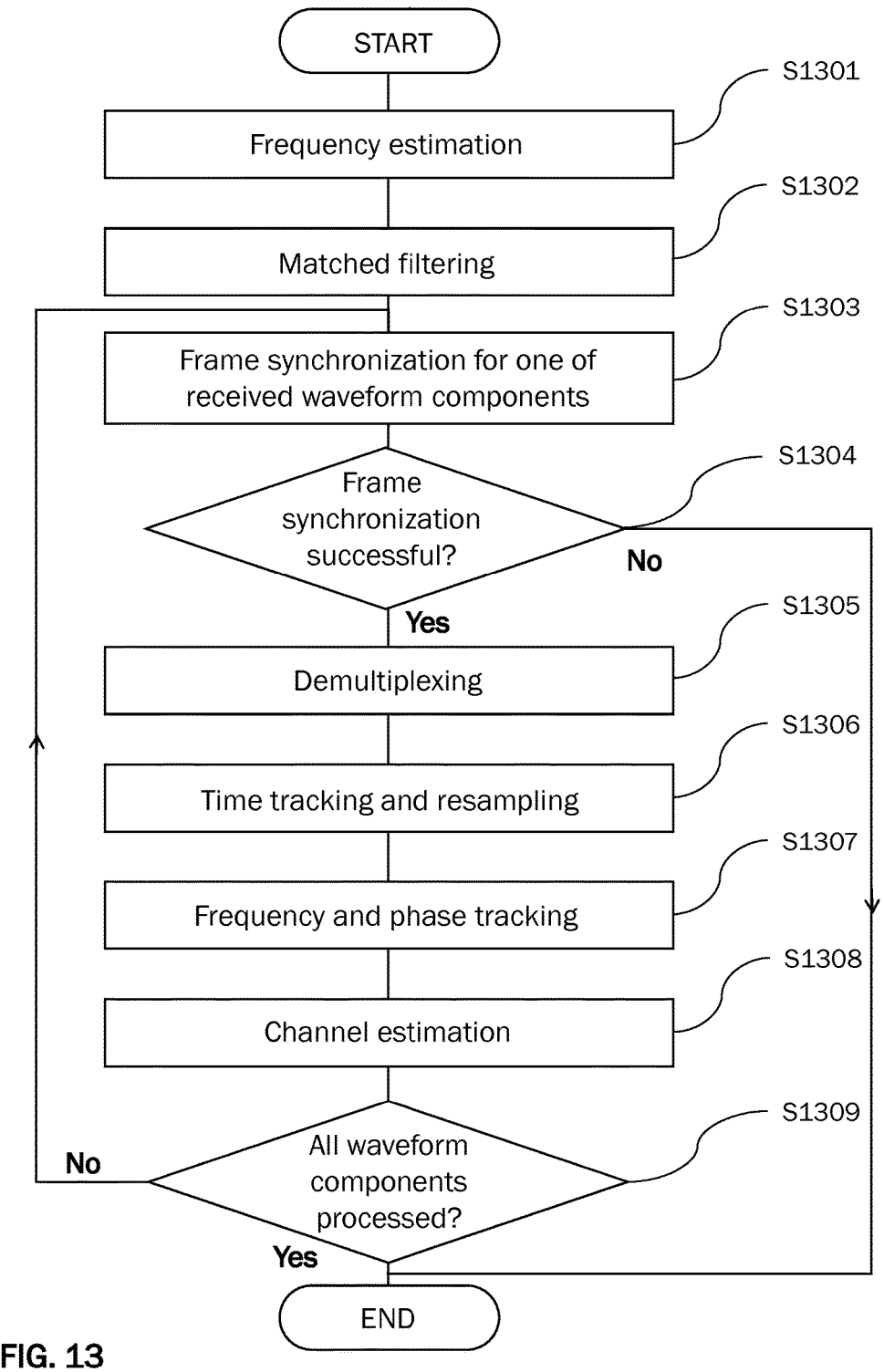
FIG. 13 is a flow chart illustrating a synchronization procedure at a UT according to an embodiment of the disclosure.

FIG. 13 is a flow chart illustrating a synchronization procedure (synchronization method) at a UT exemplarily located in the k-th beam according to an embodiment of the disclosure. This method relates to estimating a channel (channel state vector, channel vector) between a transmitter and a receiver, the transmitter wirelessly transmitting a plurality of first signals in a plurality of beams through a plurality of transmit feeds in accordance with a weighting procedure (precoding), wherein each of the plurality of first signals is subdivided into frame units (e.g., super-frames) each having a first field that is not subjected to the weighting (precoding) and that indicates a start of the respective frame unit (i.e., that comprises a (symbol) sequence indicating the start of the respective frame unit, e.g., the SoSF field of the super-frame) and one or more second fields that are not subjected to the weighting and that each comprise a predetermined pilot sequence, the receiver receiving a second signal resulting from transmission of the plurality of first signals through the plurality of transmit feeds in accordance with the weighting procedure and subsequent interference at the receiver location, wherein the second signal comprises a waveform component for each of the plurality of transmit feeds. In other words, this method relates to estimating a channel vector (channel state vector) in a wireless MU-MIMO (satellite) communication system employing precoding, wherein a receiver receives a signal comprising a plurality of waveform components, each waveform component being subdivided into frame units, wherein each frame unit has a first field that is not subjected to precoding and that indicates a start of the respective frame unit and one or more second fields that are not subjected to the precoding and that each comprise a predetermined pilot sequence. In a preferred embodiment, the frame unit comprises two or more second fields, and the steps described below are applied to said two or more second fields.

After reception of the signal, the signal is sampled in a sampling unit (not shown in FIG. 12) to obtain a sequence of samples corresponding to the received signal. At step S1301, a first frequency estimation (coarse frequency estimation) of the carrier frequency of the received signal is performed. The coarse frequency estimation may be performed for instance by the algorithm proposed in Kim et al., but of course, also other algorithms for performing the coarse frequency estimation are feasible, such as by a quadri-correlator as proposed in D'Andrea, A. N.; Mengali, U., "Design of quadricorrelators for automatic frequency control systems", IEEE Transactions on Communications, vol. 41, no. 6, pp. 988-997, June 1993, which is hereby incorporated by reference. This step is performed at the frequency acquisition unit 1201. At step S1302, matched filtering is performed in order to increase the SNIR of the received signal. Therein, the matched filter is determined based on the frequency estimated in step S1301. Methods for performing matched filtering are known in the art. This step is performed in the matched filter 1202 of FIG. 12.

At step S1303, frame synchronization is performed by searching the received signal for the known sequences of symbols (codewords) indicating the start of the super-frames (frame units) in the respective beams (i.e., respective waveform components). In other words, a start of a frame unit of a waveform component, e.g., waveform component m, is determined by searching (using a correlator), in the received signal, for a first field indicating the start of the respective frame unit. The received signal contains, in each waveform component, first fields indicating the starts of respective frame units, wherein the first fields in different waveform components are mutually orthogonal. Accordingly, the start of a frame unit in a given waveform component can be determined by correlating the received signal with a known codeword corresponding to the content of the first field of the frame units of the given waveform component. In more detail, frame synchronization may be performed using post-detection integration, which is quite insensitive to frequency errors. Post-detection integration allows recovering (determining) the start of the SF (frame unit) by referring to the SoSF (first field) at very low Signal-to-Noise Ratio (SNR) values. Frame synchronization algorithms based on post-detection integration that can for instance be used at this step are disclosed in Kim et al. and in Pedone et al. Step S1303 is performed in the frame synchronization unit 1203.

At step S1304, it is checked whether frame synchronization has been successful, that is, if there is a lock on waveform component m of the received signal $y_k(t)$, or in other words, if the start of the frame unit for the waveform component m has been determined at step S1303. In the first iteration of the synchronization procedure, it can be expected that there is a lock on the strongest waveform component, typically the waveform component (reference waveform component) relating to the signal intended for transmission in the k-th beam. If there is a lock on a waveform component, e.g., waveform component m (step S1304 returns Yes), the method proceeds to step S1305. Otherwise (step S1304 returns No), if locking on any of the waveform components that have not yet been processed fails, the method ends. At step S1305, de-multiplexing (de-framing) is performed for the waveform component m in order to separate the start of the super-frame (SoSF, i.e., a first field indicating a start of the frame unit), the pilots (i.e., one or more second fields each indicating (comprising) non-precoded pilot sequences), the precoded pilots (PLH and P2, i.e., one or more third fields each indicating (comprising) precoded pilot sequences), and data (according to the SF structure contained in the SFFI field, i.e., a fourth field containing data). Having knowledge of the structure of the frame unit, i.e., the locations of the second, third and fourth fields with respect to the start of the frame unit, and moreover having knowledge of the position of the start of the frame unit, the first, second and third fields as well as actual data (fourth field) can be separated and extracted. That is, the first field and the one or more second fields (and optionally also the one or more third fields and further optionally also the fourth field) are separated (extracted) from the received signal on the basis of the determined start of the frame unit and a known (predetermined) structure of the frame unit. This step is performed in the demultiplexer 1205.

At step S1306, data aided time tracking and resampling is performed on the basis of the SoSF and precoded (for the reference waveform component only, i.e., if the waveform component m is the reference waveform component) and non-precoded pilots (for every waveform component). In other words, a time offset $\Delta\tau_{km}$ of the waveform component (between the m-th transmit feed and the receiver in the k-th beam) is determined by referring to the first field and the one or more second fields (and optionally by also referring to the one or more third fields). In other words, this step relates to (data aided) determining a time offset of the waveform component by referring to the first field in the frame unit and the one or more second fields in the frame unit. In more detail, this is achieved by correlating the demultiplexed waveform component with a known codeword corresponding to the content of the first field and known codewords corresponding to the contents of the one or more second fields, respectively, e.g., using a (pilot-aided) early/late gate. Thereby, a refined estimate of the time offset can be determined. It is to be noted that frame synchronization as performed at step S1306 is a prerequisite for this step. Further, at step S1306, the waveform component m is resampled on the basis of the determined time offset, whereby the time offset is eliminated from the resampled waveform component, i.e., the frame units in the waveform component m are aligned with a local clock of the receiver (UT). This step is performed in the symbol re-sampling and time recovery units 1204, 1206.

At step S1307, frequency and phase tracking on precoded (for the reference waveform component only, i.e., if the waveform component m is the reference waveform component) and non-precoded pilots (for every waveform component) is performed. In other words, a frequency offset $\Delta f_{km}$ and a phase offset (between the m-th transmit feed and the receiver in the k-th beam) of the waveform component m is determined by referring to the one or more second fields in the frame unit of the waveform component m (and optionally by also referring to the one or more third fields). In other words, this step relates to (data-aided) determining a frequency offset and a phase offset of the re-sampled waveform component by referring to the one or more second fields in the frame unit. In more detail, the known codewords corresponding to the contents of the one or more second fields are compared to the one or more second fields in the frame unit (same for the one or more third fields, if applicable), and the frequency offset and phase offset are determined on the basis of the comparison. For example, the algorithm proposed in Luise, M.; Reggiannini, R., "Carrier frequency recovery in all-digital modems for burst-mode transmissions," IEEE Transactions on Communications, vol. 43, no. 2/3/4, pp. 1169, 1178, February/March/April 1995, which is hereby incorporated by reference, may be employed to this purpose. Step S1307 is performed in the first and second frequency/phase tracking units 1209, 1211.

At step S1308, channel estimation is performed on the basis of the non-precoded pilots (i.e., the one or more second fields) for each waveform component, wherein the estimated channel is to be sent back to the gateway. In other words, a channel coefficient corresponding to waveform component m is determined by referring to the one or more second fields in the frame unit, on the basis of the determined frequency offset and phase offset of the resampled waveform component. Therein, the phase of the channel coefficient is determined on the basis of the phase offset determined at step S1307 (more precisely, the phase of the channel coefficient corresponds to the phase offset determined at step S1307). Further, channel estimation involves a step of compensating the waveform component (or rather the fields extracted at step S1305 and re-sampled at step S1306) for the detected frequency offset to obtain a compensated (i.e., frequency-compensated) waveform component (or rather, compensated fields). Then, acting on the compensated waveform component (or rather, the compensated fields), referring to the one or more second fields, the amplitude (gain) of the channel coefficient is determined using a SNR estimator. This sub-step of step S1308 is performed in the first and second SNR estimation units 1208, 1210 in FIG. 12. It can be said that this sub-step of step S1308 relates to a (data aided) determination of the amplitude of the channel coefficient by referring to the one or more second fields after compensation for the frequency offset, using a SNR estimator. Therein, SNR estimation involves correlating the respective fields with the corresponding known codewords (symbols). Algorithms for SNR estimation that can for instance be used here have been proposed in Pauluzzi, D. R.; Beaulieu, N.C., "A comparison of SNR estimation techniques for the AWGN channel," IEEE Transactions on Communications, vol. 48, no. 10, pp. 1681, 1691, October 2000, and in R. M. Gagliardi and C. M. Thomas, "PCM data reliability monitoring through estimation of signal-to-noise ratio," IEEE Trans. Commun., vol. COM-16, pp. 479-486, June 1968, both of which are hereby incorporated by reference. Step S1308 is performed in the channel estimation integration unit 1212. At step S1309, it is determined whether processing of all waveform components has been attempted. If processing of all waveform components has been attempted (step S1309 returns Yes), the method ends. Otherwise (step S1309 returns No), the method returns to step S1303, at which frame synchronization for a waveform component different from waveform component m (and different from any other waveform component that has already been processed) is attempted. Regarding step S1306 and step S1307, since the precoding operation aims at reducing the interference on the reference signal caused by the remaining signals, precoded pilots (i.e., the one or more third fields) cannot be reliably used for synchronization and estimation purposes other than for the reference user. Steps S1303 to S1308 can be performed for each waveform component, i(n), n=1, 2, . . . , N, sequentially or in parallel. It is to be noted that FIG. 13 illustrates the case in which steps S1303 to S1308 are performed sequentially for all waveform components. If steps S1303 to S1308 are performed in parallel, step S1309 is omitted, and a parallel branch comprising steps S1303 to S1308 would be provided for each of the N waveform components.

Figure 14:
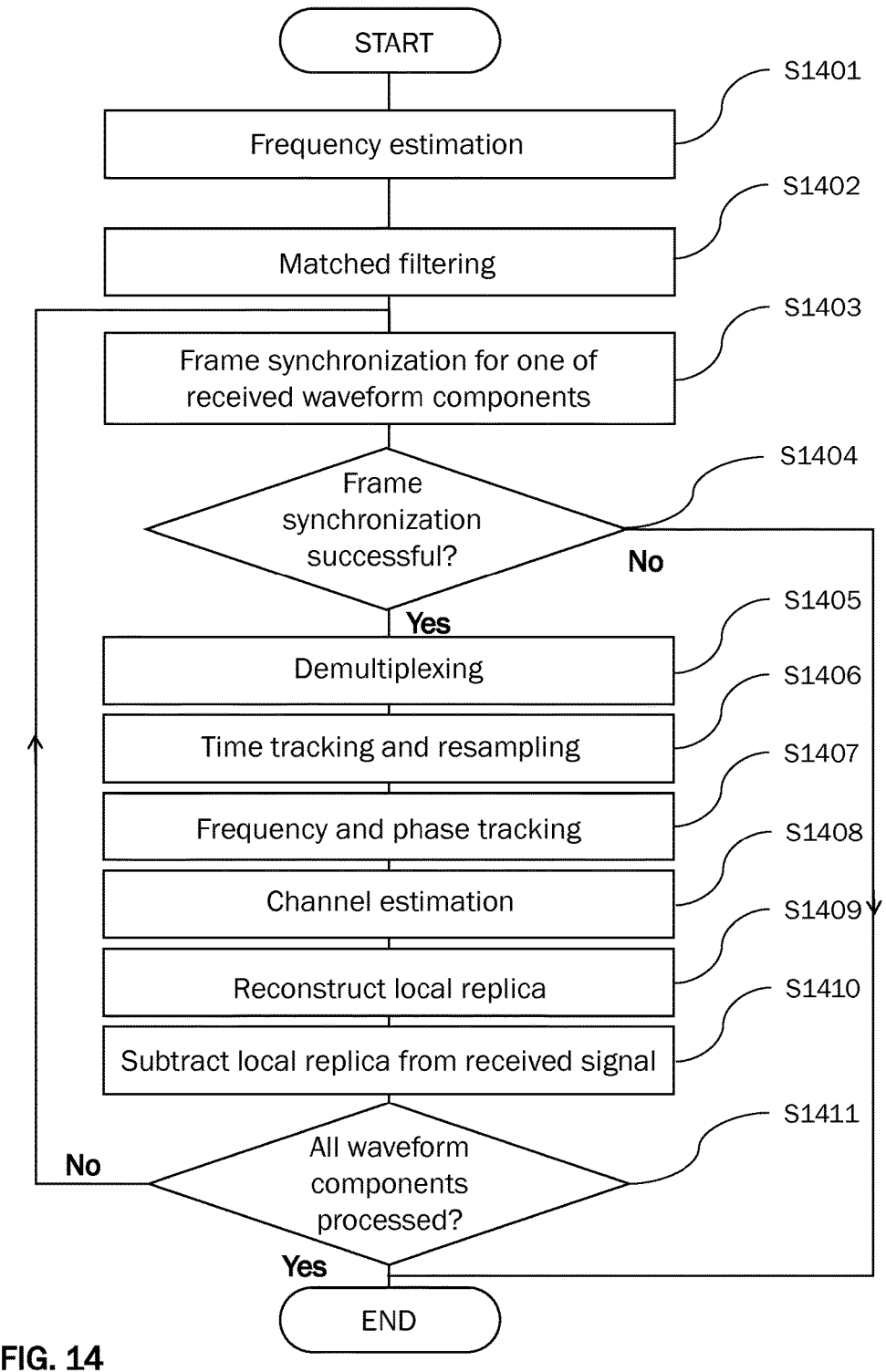
FIG. 14 is a flow chart illustrating a synchronization procedure at the UT according to another embodiment of the disclosure.

FIG. 14 is a flow chart illustrating a synchronization procedure at a UT according to another embodiment of the disclosure, which is based on the synchronization procedure described above with reference to FIG. 13. Since the strength of interfering signals at the k-th UT can be very small, or the number of interfering signals can be very large, it is foreseen that in some scenarios the proposed synchronization procedure described with reference to FIG. 13 can be interference limited for several of the received signals. The synchronization procedure described with reference to FIG. 13 can be therefore be modified by introducing an interference cancellation step as follows. Since steps S1401 to S1408 are identical to steps S1301 to S1308, respectively, in FIG. 13, description thereof in the context of the present embodiment is abbreviated for reasons of conciseness and reference is made to the above more detailed description. At step S1401 in FIG. 14, a first frequency estimation (coarse frequency estimation) of received signal $y_k(t)$ is performed. At step S1402, matched filtering of the received signal $y_k(t)$ is performed. At step S1403, frame synchronization is performed to synchronize one of the received waveform components, e.g., waveform component m. At step S1404, it is checked whether there is a lock on waveform component m. If there is a lock on waveform component m (step S1404 returns Yes), the method proceeds to step S1405. Otherwise (step S1404 returns No), the method ends. At step S1405, the m-th waveform component is de-multiplexed to separate the start of super-frame (SoSF), the pilots, the precoded pilots (PLH and P2), and data. At step S1406, data-aided time tracking and re-sampling is performed on the basis of the SoSF and precoded (for the reference waveform component, only) and non-precoded pilots (for every waveform component). At step S1407, frequency and phase tracking on precoded (for the reference waveform component, only) and non-precoded pilots (for every waveform component) is performed. At step S1408, channel estimation is performed on the basis of the non-precoded pilots for each waveform component, wherein the channel estimation is to be sent back to the gateway.

At step S1409, a local replica, $\hat{r}_{km}(t)$, of $r_{km}(t)$ is reconstructed on the basis of the estimates obtained in steps S1406, S1407, and S1408. The local replica $\hat{r}_{km}(t)$ contains non-zero values only in the SoSF, SFFI, Dummy Symbols at the end of SF, PLH, P2, and pilots fields, whereas data fields are set to zero. In other words, a replicated frame unit comprising replica of the first field and the one or more second fields (and optionally also of the one or more third fields) of the frame unit of waveform component m is generated on the basis of the determined time offset, frequency offset, phase offset and channel coefficient. That is, the known codewords corresponding to the content of the first and one or more second fields (and optionally also to the one or more third fields) are arranged in accordance with their known positions in the frame unit, the remaining parts of the resulting frame unit are filled with zeros, and the resulting frame unit is appropriately adjusted in timing, amplitude, frequency and phase in accordance with the determined time offset, frequency offset, phase offset and channel coefficient.

At step S1410, the local replica $\hat{r}_{km}(t)$ is subtracted from the received signal $y_k(t)$. Thereby, interference by the first and second fields (and optionally also by the one or more third fields) in the frame units of waveform component m to the remaining waveform components is removed, or at least ameliorated. At step S1411, it is checked whether all waveform components have been processed. If all waveform components have been processed (step S1411 returns Yes), the method ends. Otherwise (step S1411 returns No), the method returns to step S1403 for a further iteration. It is to be noted that the further iteration is applied to the received signal after matched filtering and after subtraction of the replica $\hat{r}_{km}(t)$ of waveform component m.

Next, impairments of a multi-beam satellite system channel and their formulation will be described. This part of the present description provides details on channel imperfections that will influence the performance of precoding in a real system and, hence, should be included in the full channel matrix of a multi-beam satellite system. Since the channel matrix comprises complex elements, particular emphasis is given to the phase effects that need to be accounted for in the channel matrix, as they critically impact the resulting performance of any precoding scheme.

In general, the entire route from transmission to reception (including all the analog and RF circuits, antennas and propagation) should be part of the channel definition, since it affects both its amplitude and phase. For a typical transparent system, transmission commences at the GW, the signal then passes through the transparent satellite payload and is terminated at the receiving UT. Therefore, the end-to-end UT channel is split into three segments, a), b), c), namely a) feeder link, b) satellite channel, c) user link.

The complex channel between the UT residing in beam k=1, ..., K and the antenna feed n=1, ..., N is denoted by $h_{kn}(t)=|h_{kn}(t)|e^{j\theta_{kn}(t)}$, where $|h_{kn}(t)|$ is the amplitude and $\theta_{kn}(t)$ is the phase of any subchannel of the full channel matrix $H=[h_{kn}]$. All other link budget parameters being fixed, the channel amplitude $|h_{kn}|$ depends on the satellite antenna gain and propagation effects, predominantly rain attenuation, which is slowly varying and so is $|h_{kn}|$. This type of variability is already captured in existing DVB-S2 based systems applying ACM, which need to report amplitude information from the UTs back to the GW. The signals received at the UT in the k-th beam, k=1, ..., K, from all the on-board antenna feeds is represented by the channel vector $$h_k=[h_{k1} \ldots h_{kN}]^\dagger \quad (23)$$

Finally, the full channel matrix of the K UTs that receive signals from the N on-board antenna feeds (payload chains) is represented by $$H = \begin{bmatrix} h_{11} & \cdots & h_{1N} \\ \vdots & \ddots & \vdots \\ h_{K1} & \cdots & h_{KN} \end{bmatrix} \quad (24)$$

There are various contributors rotating the channel phase $\theta_{kn}(t)$ in a time-variant fashion: in the feeder link, the GW local oscillator (LO) along with its frequency/phase instabilities, as well as the feeder link geometry, in the satellite transponder/channel, and the LOs of the frequency converters along with their frequency/phase instabilities. Also, the movement of the satellite within its station keeping box modifies both the user and feeder link geometries making the phase time-variant. Further, in the user link, the user link geometry and the LO of the UT's receiver low noise block (LNB) have an impact on the channel phase $\theta_k(t)$. Of course, apart from these main contributors, all other active and passive elements introduce a phase rotation to the propagating electromagnetic wave, which will be slowly time-variant depending on temperature variations and aging of components.

Figure 15:
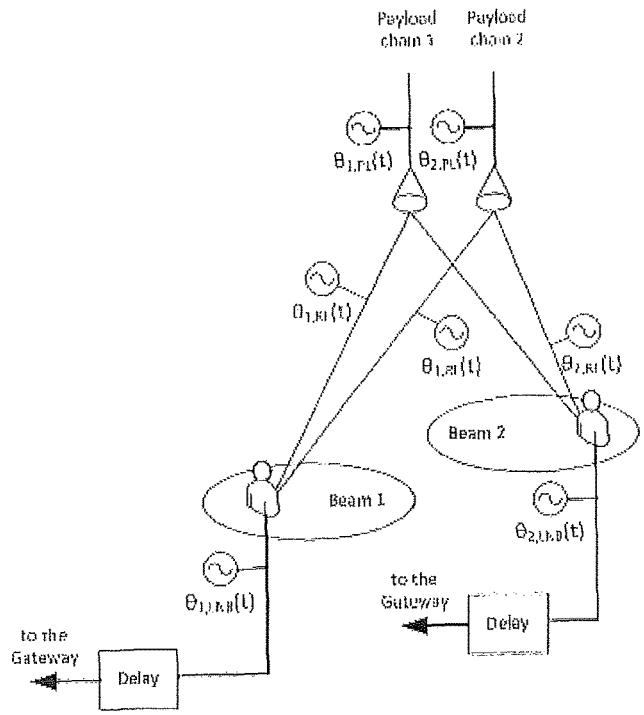
FIG. 15 schematically illustrates an example of phase contributions to the channel matrix.

FIG. 15 provides an overview of the various phase contributions for a simplified scenario involving two payload chains (transmit feeds) and two UT beams on ground. The sources and the characteristics of these phase contributions are detailed next. As illustrated in FIG. 15, the time varying total phase of any single sub-channel arriving at the UT, $\theta_{tot}(t)$, mainly comprises three components:

$$\theta_{tot}(t)=\theta_{PL}(t)+\theta_{RF}(t)+\theta_{LNB}(t) \quad (25)$$

where $\theta_{PL}(t)$ is the contribution of the payload chain, $\theta_{RF}(t)$ is the contribution of the slant path geometry, and $\theta_{LNB}(t)$ is the contribution of the receiver LNB. Since the on-board antenna feeds serving the user link are only spaced from each other by tens of cm, all elements in the channel vector $h_k$ of UT in the k-th beam have the same geometrical phase contribution (common slant path). Therefore, the phase contributions coming from the geometrical RF path $[\theta_{kn}]_{RF}$ are equal for all n=1, ..., N (see FIG. 15). The same applies also to the phase contribution in FIG. 15 coming from the local LNB of each UT, $[\theta_{kn}]_{LNB}$. By contrast, each UT sees a different phase contribution $[\theta_{kn}]_{PL}$ coming from different payload chains. Since each of the payload chains is down-converted by a different LO, the relative phases arriving at the UT in the k-th beam from the N feeds are completely random. As has been found out by the inventors, the phase deviations amid the payload (PL) chains $[\theta_{kn}]_{PL}$ can be represented by a zero mean Gaussian distribution with a standard deviation of approximately $\sigma=20°$. $[\theta_{kn}]_{PL}$ also captures potential phase offsets between LOs at the GW side, wherein however synchronizing the LOs is more straightforward than in the payload. Based on these considerations, the most appropriate assumption for the phases of the elements in the channel matrix corresponding to different UTs (across the rows of the channel matrix) is the uniform random distribution [0, $2\pi$). Then, to model the phase deviations between the transmit feeds, a $N(0,\sigma^2)$ Gaussian distribution can be adopted with $\sigma=20°$. Moreover, for advanced interference mitigation techniques, an accurate estimate of the whole channel matrix including the phase of each UT must be available at the transmit GW side to pre-compensate interference. Although typical DVB-S2 systems for enabling adaptive coding and modulation (ACM) adaptation already offer a mechanism for amplitude (i.e., SNIR) reporting from the terminal back to the GW, feeding back the phase of the UT will lead to an outdated phase estimate. As stated earlier, the super-frame structure included in the recent release of the DVB-S2X standard provides a full feedback mechanism of both amplitude and phase of a limited number of sub-channels.

Phase estimation of any complex sub-channel by a UT proceeds as follows:

1) The UT makes a data aided estimate of the incoming signal $$\hat{\theta}_{tot}(t) = \theta_{tot}(t) + e(t) \quad (26)$$

Since this is done using a commercial LNB, an estimation error e(t) is introduced, which however is expected to have typically a small standard deviation (less than about 1 deg).

2) The UT periodically provides phase reports $\hat{\theta}_{tot}(t+\Delta t)$ every period of time $\Delta t$ to the GW. For example, if 16 bits are devoted for feeding back the phase every $\Delta t$=100 ms, the overhead for feeding back the phase will amount to 160 bits/s. The estimate $\hat{\theta}_{tot}(t)$ will arrive at the GW after 350 ms, i.e., 100 ms (periodicity of feedback)+250 ms (two hop propagation delay from GEO orbit).

3) The GW will apply this phase estimate (as well as the amplitude estimate) to compute the interference pre-compensation weights and will transmit the forward link signal toward the UT (assuming no queuing and processing delay). The signal will be received at the UT after an additional two hop propagation delay of 250 ms.

In total, the UT phase estimate $\hat{\theta}_{tot}(t)$ will be outdated by at least 500 to 600 ms. In order to understand how much it will have changed during this period, the UT phase noise process will be modeled in the following. Note that due to the low cost nature of commercial UTs, the LNB phase noise performance is relatively poor. Table 1 lists a typical phase noise mask of a commercial UT (P1 mask of DVB-S2 Channel Model Report DVB-TM-S2 Channel Model Group, "DVB-Sx Channel Models", Available at: http:www.dvb.org, TM-S2 Working Group, uploaded on Jan. 18, 2013, Document ID: TM-S20125). Assuming a typical baud rate of 200 Msym/s and the DVB-S2 pilot periodicity of 1476 symbols with duration 7.3 µs, the PLL bandwidth, which will be a lower integration limit of the mask in Table 1, is found to be 137 kHz. This yields a phase noise RMS of 0.24 deg.

TABLE 1

| P1 phase noise mask for commercial terminals. | | | | | | | |
|---|---|---|---|---|---|---|---|
| P1 mask | 100 Hz | 1 kHz | 10 kHz | 100 kHz | 1 MHz | 10 MHz | ≥50 MHz |
| SSB (dBc/Hz) | −25 | −50 | −73 | −92.25 | −102.49 | −113.23 | −115.89 |

To conclude this discussion, a summary of the phase contributions discussed above will be provided. The total phase between satellite on-board antenna feed n=1, . . . , N and on ground UT in beam k=1, . . . , K according to Eq. (25) is given by $[\theta_{kn}]_{tot}(t) = [\theta_{kn}]_{PL} + [\theta_{kn}]_{RF} + [\theta_{kn}]_{LNB}(t)$. The phase contribution due to the n=1, . . . , N payload chains is given by $[\theta_{kn}]_{PL} = [\theta_n]_{PL}(t)$ and without payload calibration has a distribution corresponding to a Gaussian offset N(0, $\sigma^2$), $\sigma=20°$ between the feeds. The phase contribution due to slant path range, which is different between k=1, . . . , K UTs is given by $[\theta_{kn}]_{RF}(t) = [\theta_k]_{RF}(t)$ and has a distribution that depends deterministically on the satellite movement. Lastly, the phase contribution due to receiver LNB, which is different between k=1, . . . , N UTs is given by $[\theta_{kn}]_{LNB}(t) = [\theta_{kn}]_{LNB}(t)$, wherein the phase error varies according to a Gaussian N(0, $\sigma^2$), where $\sigma=0.24°$ (P1 phase noise mask).

Next, as a way of providing a typical application example of the disclosure, the Geographic User Clustering algorithm for precoding will be applied to the channels of $N_u$=2 users (terminals) per frame in a multi-beam system offering broadband interactive services. The system assumptions that are used in this example are listed in Table 2.

TABLE 2

| Assumed parameters of the exemplary system. | |
|---|---|
| Parameter | Value |
| Beams in the system | 245 Single Feed per beam (K = N = 245) |
| Color scheme for precoding | Full frequency and polarization re-use |
| Reference color scheme | 4 colors (2 freq.-2 polar) |
| Frequency of operation | 20 GHz |
| User bandwidth | 500 MHz |
| Saturated RF power from each feed | 55 W |
| OBO | 5 dB |
| Output power for reference 4 colors | 17.3 W |
| Output power for precoding | 8.7 W |
| Roll-off | 0.2 |
| Terminal Antenna G/T | 16.9 dB/K |

Instead of presenting results for all of the 245 beams in the system, the results will be presented for $N_u$=2 UTs located in a specific beam (beam 6) and limiting to the most important channel contributions that originate from the 15 closest beams in the vicinity of the beam of interest. Under these assumptions, the stationary complex channel vector between 15 satellite antenna feeds and User 1 in Beam 6 is given by

[−0.0554−0.0970i, −0.0586−0.1054i, −0.0240−0.05061, −0.0073−0.0113i, −0.0119−0.0141i, −0.0085−0.0258i, −0.0135−0.0370i, −0.0475−0.0286i, −0.0661−0.0384i, −0.1410−0.1292i, −0.6655−1.0882i, −0.2614−0.3312i, −0.0291−0.0138i, −0.0074−0.0071i, −0.0193+0.0035i], wherein i denotes the imaginary unit. Similarly, the complex channel vector between 15 satellite antenna feeds and User 2 in Beam 6 is given by

[−0.0946+0.0594i, −0.1028+0.0630i, −0.0495+0.0262i, −0.0110+0.0077i, −0.0136+0.0125i, −0.0254+0.0096i, −0.0364+0.0151i, −0.0266+0.0487i, −0.0355+0.0677i, −0.1230+0.1464i, −1.0589+0.7112i, −0.3198+0.2753i, −0.0126+0.0296i, −0.0068+0.0077i, 0.0043+0.0192i].

Following the Geographic User Clustering algorithm, the precoding vector applied for both the channels of Users 1 and 2 in Beam 6 is expressed as

[−0.0645+0.0061i, 0.0252−0.0024i, −0.0411+0.0039i, 0.0018−0.0002i, −0.0026+0.0003i, −0.0044+0.0004i, 0.0042−0.0004i, −0.0142+0.0013i, −0.0043+0.0004i, −0.0000+0.0000i, 0.8103−0.0823i, −0.2250+0.0209i, 0.0829−0.0080i, 0.0356−0.0034i, −0.0113+0.0012i].

For the full frequency re-use system, the SNIR for User 1 in Beam 6 without precoding is equal to 5.1 dB, whereas the introduction of precoding yields an improved SNIR of 7.5 dB. Due to the proximity between the two users that are presently considered, the SNIR results for User 2 in beam 6 will be almost identical.

These results should be compared with a reference four-color system, in which case the SNIR for User 1 in beam 6 turns out to be 15.4 dB. Although this SNIR value is substantially better than the precoded one, once these values are translated into capacity, the results are better in the case of the full frequency re-use system employing precoding because of the much wider bandwidth being used. For example, if the spectral efficiency of the DVB-S2 ModCods is used to determine capacity, then the throughput for Users 1 and 2 in beam 6 in case of precoding is given by 2*BW_user/(1+roll_off)*loglike(SNIR_f)=1.6 Gbps, where loglike(.) is a function relating the SNIR of the full frequency re-use scheme (SNIR_f) to the spectral efficiency of the DVB-S2 ModCods. On the other hand, the throughput for Users 1 and 2 in beam 6 in case of the reference four-color system is given by BW_user/(2*(1+roll_off)) *loglike(SNIR_4c)=0.8 Gbps, where loglike(.) is a function relating the SNIR of the reference four-color frequency re-use scheme (SNIR_4c) to the spectral efficiency of the DVB-S2 ModCods. This corresponds to a throughput gain of 100%.

The above application example is rather specific in terms of number and position of UTs, selection of beam and precoding algorithm. In order to complement this rather specific example, now results obtained via computer simulations over the same system described in Table 2, but reporting the average capacity of the whole system (totality of UTs and spot beams) and for all three algorithms for precoding according to the present disclosure will be provided. It is worth noting that the system capacity has been averaged over UTs residing on a uniform grid over the coverage area. That is, no non-uniformity of UTs has been taken into account in the simulations. Although this uniformity of UTs is not fully representative of a real system, it is believed that this corresponds to a worst-case scenario as regards positioning of UTs, since any non-uniform positioning of UTs will improve their channel similarity and yield a higher performance of the inventive precoding technique.

Table 3 provides a summary of computer simulation results employing the three inventive algorithms and assuming that the GW is perfectly aware of the UT complex channels.

TABLE 3

Average system capacity gains of a multi-beam system employing precoding compared to a reference four-color system without precoding.

| #Users in the frame | System Capacity Gain over Reference four-color |
|---|---|
| Algorithm 1: Geographic User Clustering | |
| 2 | 108.0% |
| 5 | 85.6% |
| 10 | 58.5% |
| Algorithm 2: Parallel User Selection | |
| 2 | 102% |
| 5 | 66% |
| 10 | −14.8% |
| Algorithm 3: Block Singular Value Decomposition | |
| 2 | 152% |
| 5 | 92% |
| 10 | 38% |

The simulation results presented in Table 3 refer to a case in which ideal channel estimation is available both at the UT and the GW. Simulation results for the same system model as in Table 3 but this time including the channel impairments described above with reference to FIG. 15 are presented below. All results include the phase contribution due to the payload chains $\theta_{PL}(t)$, which turns out not to influence the capacity results.

There is significant impact by non perfect channel state information (CSI) either at the receiver (CSIR) or at the transmitter (CSIT). In a similar fashion as in Table 3, Table 4 presents the gains of a system employing precoding over the reference system when the CSIR is imperfect (due to channel estimation inaccuracies) and the CSIT arriving at the GW is perfect. Of course, since the estimation is carried out at the UT side, this is not a realistic situation, and it is considered mainly as a part of a sensitivity analysis.

TABLE 4

Average system capacity gains of a multi-beam system employing precoding compared to a reference four-color system without precoding assuming perfect CSIT and imperfect CSIR.

| #Users in the frame | System Capacity Gain over Reference four-color |
|---|---|
| Algorithm 1: Geographic User Clustering | |
| 2 | 83% |
| 5 | 77% |
| 10 | 55.9% |
| Algorithm 2: Parallel User Selection | |
| 2 | 22.24% |
| 5 | 7.7% |
| 10 | −18% |
| Algorithm 3: Block Singular Value Decomposition | |
| 2 | N/A |
| 5 | N/A |
| 10 | N/A |

Table 5 and Table 6 present the gains of a system employing precoding over the reference system assuming perfect CSIR and imperfect CSIT (due to the CSI arriving outdated) for $\sigma_{RF}=10$ deg and $\sigma_{RF}=30$ deg, respectively.

TABLE 5

Average system capacity gains of a multi-beam system employing precoding compared to a reference four-color system without precoding assuming imperfect CSIT ($\sigma_{RF} = 10$ deg) and perfect CSIR.

| #Users in the frame | System Capacity Gain over Reference four-color |
|---|---|
| Algorithm 1: Geographic User Clustering | |
| 2 | 91% |
| 5 | 80.0% |
| 10 | 55.0% |
| Algorithm 2: Parallel User Selection | |
| 2 | 30% |
| 5 | 11.7% |
| 10 | −14% |
| Algorithm 3: Block Singular Value Decomposition | |
| 2 | −7% |
| 5 | 12% |
| 10 | 4% |

TABLE 6

Average system capacity gains of a multi-beam system employing precoding compared to a reference four-color system without precoding assuming imperfect CSIT ($\sigma_{RF} = 30$ deg) and perfect CSIR.

| #Users in the frame | System Capacity Gain over Reference four-color |
|---|---|
| Algorithm 1: Geographic User Clustering | |
| 2 | 31.6% |
| 5 | 49.6% |
| 10 | 42.6% |
| Algorithm 2: Parallel User Selection | |
| 2 | N/A |
| 5 | N/A |
| 10 | N/A |

TABLE 6-continued

Average system capacity gains of a multi-beam system employing precoding compared to a reference four-color system without precoding assuming imperfect CSIT ($\sigma_{RF}$ = 30 deg) and perfect CSIR.

| #Users in the frame | System Capacity Gain over Reference four-color |
|---|---|
| Algorithm 3: Block Singular Value Decomposition | |
| 2 | N/A |
| 5 | N/A |
| 10 | N/A |

Although in the above reference is made to the DVB-S2 and DVB-S2X standards, it is understood that the present disclosure is independent of these standards. It is further understood that method steps described above can be performed by hardware or software, or combinations of hardware and software. Accordingly, respective units for performing the method steps may be implemented as hardware or may be computer-implemented. That is, respective units executing these method steps can be achieved as desired by the cooperation of hardware and software, and do not suggest a specific hardware configuration. It is yet further understood that for each of the method steps described above a corresponding apparatus comprises respective units and sub-units configured for executing these method steps. For reasons of conciseness, not all of such units are explicitly mentioned in the above description.

Features, components and specific details of the structures of the above-described embodiments may be exchanged or combined to form further embodiments optimized for the respective application. As far as those modifications are readily apparent for an expert skilled in the art, they shall be disclosed implicitly by the above description without specifying explicitly every possible combination, for the sake of conciseness of the present description.

What is claimed is:

1. A method for channel estimation in a wireless MU-MIMO communication system employing preceding, the method comprising steps of:
    (A) receiving a signal comprising a plurality of waveform components, each waveform component being subdivided into frame units, wherein each frame unit has a first field that is not subjected to precoding and that indicates a start of the respective frame unit and one or more second fields that are not subjected to the precoding and that each comprise a pilot sequence;
    (B) for a waveform component of the plurality of waveform components, determining a start of a frame unit of the waveform component by searching in the received signal for the first field indicating the start of the frame unit;
    (C) determining a time offset of the waveform component by referring to the first field in the frame unit and the one or more second fields in the frame unit;
    (D) re-sampling the waveform component on the basis of the determined time offset to obtain a re-sampled waveform component;
    (E) determining a frequency offset and a phase offset of the re-sampled waveform component by referring to the one or more second fields in the frame unit of the resampled waveform component; and
    (F) estimating a channel coefficient corresponding to the waveform component by referring to the one or more second fields in the frame unit, on the basis of the determined frequency offset and phase offset of the re-sampled waveform component,
    wherein the above steps are performed in the order (A) to (F).

2. The method according to claim 1, wherein steps (B) to (F) are performed for each of the plurality of waveform components.

3. The method according to claim 1, further comprising the steps of:
    (G) generating a replicated frame unit comprising replica of the first field and the one or more second fields of the frame unit of the waveform component on the basis of the determined time offset, frequency offset, phase offset and channel coefficient; and
    (H) subtracting the replicated frame unit from the received signal,
    wherein steps (G) and (H) are performed after step (F); and
    the method further comprises performing steps (A) to (F) again for another waveform component of the received signal after performing step (H).

4. The method according to claim 3, wherein steps (B) to (H) are performed for each of the plurality of waveform components.

5. The method according to claim 3, further comprising the steps of:
    (I) estimating a frequency of the received signal;
    (J) determining a matched filter on the basis of the estimated frequency and filtering the received signal using the determined matched filter; and
    (K) de-multiplexing the waveform component to separate the first field and the one or more second fields in the frame unit of the waveform component,
    wherein steps (G) and (H) are performed after step (A) and before step (B), and step (K) is performed after step (B) and before step (C).

6. An apparatus for estimating a channel in a wireless MU-MIMO communication system employing precoding, the apparatus comprising:
    a reception unit configured for receiving a signal comprising a plurality of waveform components, each waveform component being subdivided into frame units, wherein each frame unit has a first field that is not subjected to precoding and that indicates a start of the respective frame unit and one or more second fields that are not subjected to the precoding and that each comprise a pilot sequence;
    a frame synchronization unit configured for determining a start of a frame unit of a waveform component of the plurality of waveform components by searching in the received signal for the first field indicating the start of the frame unit;
    a time offset determination unit configured for determining a time offset of the waveform component by referring to the first field in the frame unit and the one or more second fields in the frame unit;
    a re-sampling unit configured for re-sampling the waveform component on the basis of the determined time offset to obtain a re-sampled waveform component;
    a frequency/phase offset determination unit configured for determining a frequency offset and a phase offset of the re-sampled waveform component by referring to the one or more second fields in the frame unit of the re-sampled waveform component; and
    a channel coefficient estimation unit configured for estimating the channel coefficient corresponding to the waveform component by referring to the one or more second fields in the frame unit, on the basis of the determined frequency offset and phase offset of the re-sampled waveform component.

\* \* \* \* \*